United States Patent
Beale et al.

(10) Patent No.: US 11,516,736 B2
(45) Date of Patent: Nov. 29, 2022

(54) WIRELESS COMMUNICATIONS SYSTEM, COMMUNICATIONS DEVICE AND WIRELESS NETWORK INFRASTRUCTURE

(71) Applicant: Sony Corporation, Tokyo (JP)

(72) Inventors: Martin Warwick Beale, Basingstoke (GB); Shin Horng Wong, Basingstoke (GB); Vivek Sharma, Basingstoke (GB); Samuel Asangbeng Atungsiri, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 158 days.

(21) Appl. No.: 16/626,569

(22) PCT Filed: Aug. 1, 2018

(86) PCT No.: PCT/EP2018/070903
§ 371 (c)(1),
(2) Date: Dec. 26, 2019

(87) PCT Pub. No.: WO2019/030079
PCT Pub. Date: Feb. 14, 2019

(65) Prior Publication Data
US 2020/0120606 A1  Apr. 16, 2020

(30) Foreign Application Priority Data

Aug. 11, 2017 (EP) .................................. 17186062

(51) Int. Cl.
*H04W 52/02* (2009.01)
*H04W 76/28* (2018.01)
(Continued)

(52) U.S. Cl.
CPC ... *H04W 52/0229* (2013.01); *H04W 52/0216* (2013.01); *H04W 72/121* (2013.01);
(Continued)

(58) Field of Classification Search
None
See application file for complete search history.

(56) References Cited

U.S. PATENT DOCUMENTS 9,872,252 B1 *   1/2018  Ang ................. H04W 52/0229
2005/0180378 A1  8/2005  Lee et al.
(Continued)

OTHER PUBLICATIONS

International Search Report and Written Opinion dated Dec. 14, 2018 for PCT/EP2018/070903 filed on Aug. 1, 2018, 17 pages.
(Continued)

*Primary Examiner* — Jutai Kao
(74) *Attorney, Agent, or Firm* — Xsensus LLP

(57) ABSTRACT

A method comprising controlling a receiver of a communications device to reduce a power consumption in accordance with a discontinuous reception, DRX, off period in which no signals representing scheduling information are received via a physical downlink control channel when in a connected mode and in which the communications device can reduce a power to the receiver, controlling the receiver of the communications device to increase the power consumption so as to detect whether or not signals from a group control channel have been received by the receiver either during the DRX off period or during a first time slot of a DRX on period in which signals representing scheduling information may be transmitted by the wireless communications network via the physical downlink control channel and in which the communications device may increase the power to the receiver.

11 Claims, 9 Drawing Sheets

(51) Int. Cl.
  *H04W 72/12* (2009.01)
  *H04W 76/27* (2018.01)
(52) U.S. Cl.
  CPC ....... *H04W 72/1289* (2013.01); *H04W 76/28* (2018.02); *H04W 76/27* (2018.02)

(56) References Cited

U.S. PATENT DOCUMENTS

2020/0145921 A1* 5/2020 Zhang .................. H04W 76/27
2020/0245395 A1* 7/2020 Zhang .................. H04L 5/0053

OTHER PUBLICATIONS

Apple Inc., "Control Indicator in Group-common PDCCH for UE Power Saving," 3GPP TSG-RAN WG1 NR No. 2, R1-1710907, Qingdao, China, Jun. 27-30, 2017, 5 pages.
Holma, H., and Toskala, A., "LTE for UMTS: OFDMA and SC-FDMA Based Radio Access," System Architecture Based on 3GPP SAE, John Wiley & Sons, Apr. 1, 2009, ISBN 9780470994016, pp. 25-27.
Huawei and Hisilicon, "Considerations on 'wake-up signal' for eFeMTC," 3GPP TSG RAN WG1 Meeting No. 88bis, R1-1704282, Spokane, USA, Apr. 3-7, 2017, 4 pages.
Qualcomm Incorporated, "Advanced Grant Indication for UE Power Saving," 3GPP TSG RAN WG1 NR Ad-Hoc No. 2, R1-1711187, Qingdao, P.R. China, Jun. 27-30, 2017, 5 pages.
Qualcomm Incorporated, "UE Power Evaluation for DRX with Wake-Up Signaling," 3GPP TSG-RAN WG1, No. 87, R1-1612068, Reno, USA, Nov. 14-18, 2016, 7 pages.

* cited by examiner

WIRELESS COMMUNICATIONS SYSTEM, COMMUNICATIONS DEVICE AND WIRELESS NETWORK INFRASTRUCTURE

CROSS-REFERENCE TO RELATED APPLICATIONS

The present application is based on PCT filing PCT/EP2018/070903, filed Aug. 1, 2018, which claims priority to EP 17186062.0, filed Aug. 11, 2017, the entire contents of each are incorporated herein by reference.

BACKGROUND

Field of Disclosure

The present disclosure relates to wireless communications systems, communications devices and wireless network infrastructure, which are configured to provide a group control information indicative of a future transmission of scheduling information for a communications device in a connected mode.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Wireless telecommunications systems, such as those based on the 3GPP defined Long Term Evolution (LTE) and Long Term Evolution Advance (LTE-A) architectures or those based on a new radio (NR) technology currently in development, are applicable to communications between networked user devices such as mobile telephones, and more widely also to applications such as the Internet of Things. The networked devices are supported by a telecommunications network comprising base stations or infrastructure equipment of various configurations offering wireless connection coverage using radio signals over particular areas, known as cells, and the base stations are in turn supported by a core network.

In order to make efficient use of finite spectrum resources, base stations or infrastructure equipment may schedule data transmissions either to the networked devices or from the networked devices using shared resources, which are not dedicated to a particular networked device. Although this improves the overall efficiency of the network, it results in a need for each networked device to periodically power up its receiver in order to receive scheduling information which indicates whether the network has scheduled a transmission to or from the device, and if so, which time or frequency resources have been allocated for the scheduled transmission.

Most networked devices are battery powered, and therefore there is a desire to reduce the power consumption of the networked devices. In order to reduce the power consumption associated with the use of the device's receiver to receive the scheduling information, discontinuous reception techniques have been developed, by which the scheduling information for a given communications device is constrained to be transmitted within certain periodic time intervals. Although this reduces the scheduling flexibility available to the network, it permits the device to power down its receiver outside of these intervals, thereby reducing its power consumption.

However, it remains a challenge to improve i.e. reduce the power consumption further for all types of communications devices, without impacting the latency of communicating with communication devices.

SUMMARY OF THE DISCLOSURE

According to an example embodiment of the present technique, there is provided a method performed in a communications device for receiving signals from a wireless communications network. The method comprises controlling a receiver of the communications device to reduce a power consumption in accordance with a discontinuous reception, DRX, off period in which no signals representing scheduling information are received via a physical downlink control channel when in a connected mode and in which the communications device can reduce a power to the receiver, controlling the receiver of the communications device to increase the power consumption so as to detect whether or not signals from a group control channel have been received by the receiver either during the DRX off period or during a first time slot of a DRX on period in which signals representing scheduling information may be transmitted by the wireless communications network via the physical downlink control channel and in which the communications device may increase the power to the receiver, the group control channel providing a channel of a wireless access interface provided by the wireless communications network for receiving group control information transmitted by the wireless communications network for a group of communications devices, the communications device being a member of the group, and the group control information received on the group control channel providing an indication of whether the communications device should configure the receiver to receive the scheduling information on the physical downlink control channel during a time period.

The method further comprises, if the signals from the group control channel have been received by the receiver and the group control information indicates that the communications device should configure the receiver to receive the scheduling information on the physical downlink control channel during the time period and the time period is within the DRX on period, then controlling the receiver to restore power to the receiver so as to receive the scheduling information via the physical downlink control channel during the time period within the DRX on period indicated by the group control information, receiving the signals representing scheduling information via the physical downlink control channel of the wireless access interface, and configuring the receiver to receive signals via a shared channel of the wireless access interface in accordance with the scheduling information.

Accordingly, the power consumption of the communications device may be reduced at least in the case that no scheduling information is to be transmitted during the DRX on period.

Various further aspects and features of the present invention are defined in the appended claims and include methods performed in the first and second infrastructure equipment, a communications device, infrastructure equipment, and a system.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
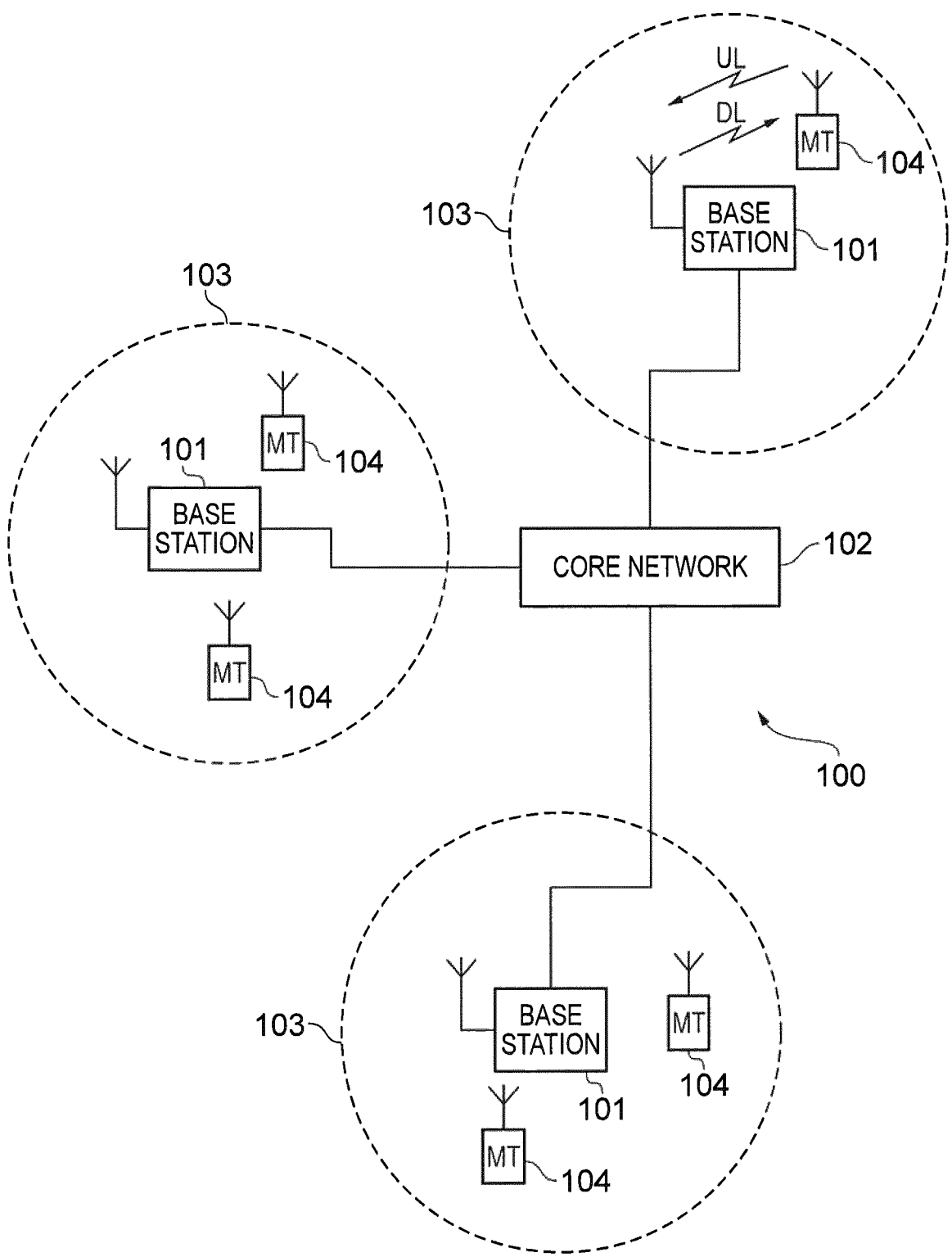
FIG. 1 schematically represents some aspects of a LTE-type wireless telecommunication system which may be configured to operate in accordance with certain embodiments of the present disclosure.

FIG. 1 provides a schematic diagram illustrating some basic functionality of a mobile telecommunications network/system 100 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [3]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 100 includes a plurality of base stations 101 connected to a core network 102. Each base station provides a coverage area 103 (i.e. a cell) within which data can be communicated to and from terminal devices 104. Data can be transmitted from the base stations 101 to the terminal devices 104 within their respective coverage areas 103 via a radio downlink. Data can be transmitted from the terminal devices 104 to the base stations 101 via a radio uplink. The core network 102 routes data to and from the terminal devices 104 via the respective base stations 101 and provides functions such as authentication, mobility management, charging and so on. The terminal devices 104 may also be referred to as mobile stations, user equipment (UE), user terminal, mobile radio, communications device, and so forth. The base stations, which are an example of network infrastructure equipment/network access nodes, may also be referred to as transceiver stations/nodeBs/e-nodeBs, g-nodeBs and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

Figure 2:
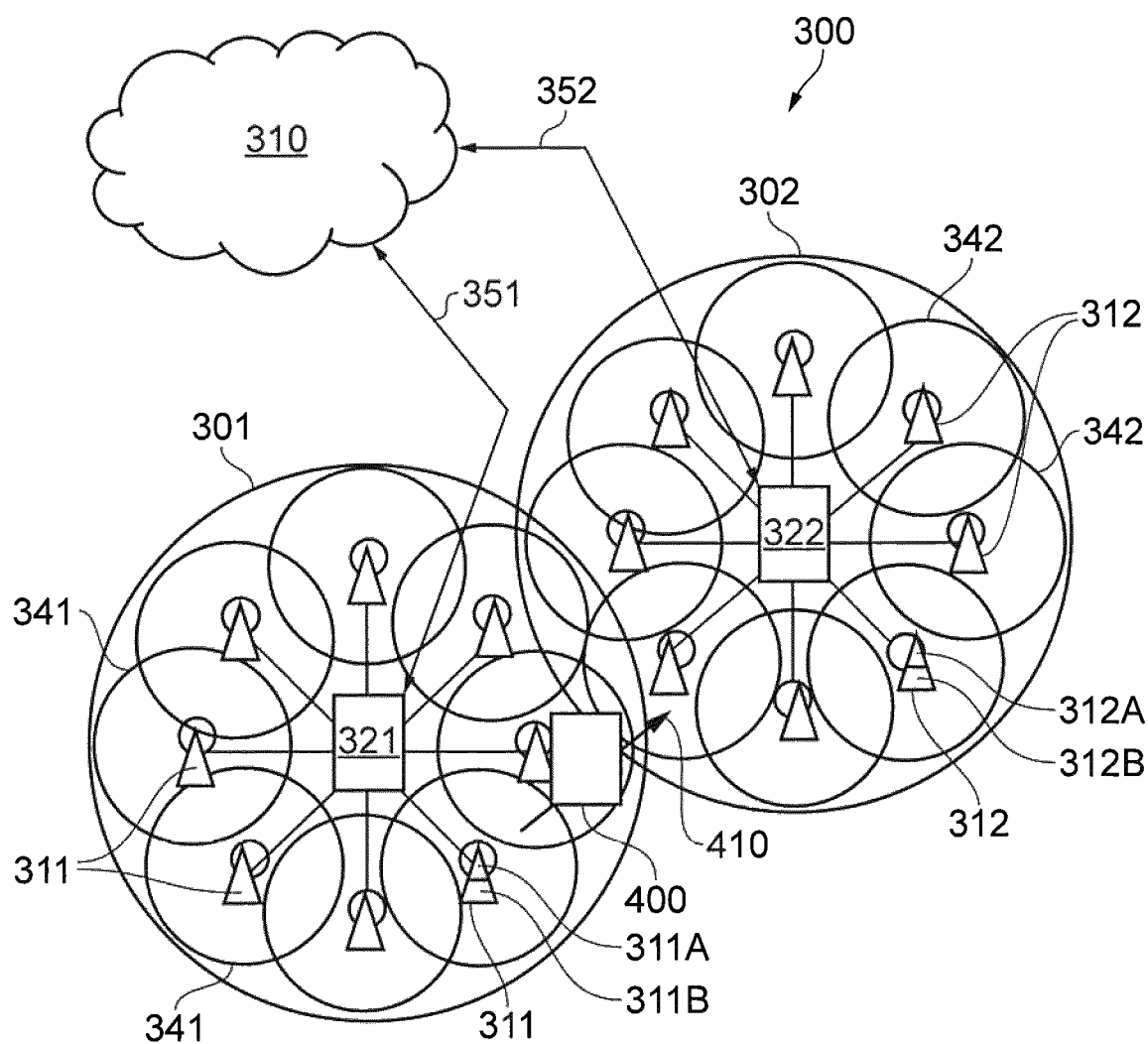
FIG. 2 schematically represents some aspects of a new radio access technology (RAT) wireless telecommunications system which may be configured to operate in accordance with certain embodiments of the present disclosure.

FIG. 2 is a schematic diagram illustrating a network architecture for a new radio (NR) wireless mobile telecommunications network/system 300 based on previously proposed approaches which may also be adapted to provide functionality in accordance with embodiments of the disclosure described herein. The new RAT network 300 represented in FIG. 2 comprises a first communication cell 301 and a second communication cell 302. Each communication cell 301, 302, comprises a controlling node (centralised unit) 321, 322 in communication with a core network component 310 over a respective wired or wireless link 351, 352. The respective controlling nodes 321, 322 are also each in communication with a plurality of distributed units (radio access nodes/remote transmission and reception points (TRPs)) 311, 312 in their respective cells. Again, these communications may be over respective wired or wireless links. The distributed units 311, 312 are responsible for providing the radio access interface for terminal devices connected to the network. Each distributed unit 311, 312 has a coverage area (radio access footprint) 341, 342 which together define the coverage of the respective communication cells 301, 302. Each distributed unit 311, 312 includes transceiver circuitry 311A, 312A for transmission and reception of wireless signals and processor circuitry 311B, 312B configured to control the respective distributed units 311, 312.

In terms of broad top-level functionality, the core network component 310 of the new RAT telecommunications system represented in FIG. 2 may be broadly considered to correspond with the core network 102 represented in FIG. 1, and the respective controlling nodes 321, 322 and their associated distributed units/TRPs 311, 312 may be broadly considered to provide functionality corresponding to base stations of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the terminal devices may lie with the controlling node/centralised unit and/or the distributed units/TRPs. The term infrastructure equipment may be used to refer collectively to controller circuitry, transmitter circuitry and receiver circuitry which perform scheduling, transmission and reception of signals on a wireless access interface.

A terminal device 400 is represented in FIG. 2 within the coverage area of the first communication cell 301. This terminal device 400 may thus exchange signalling with the first controlling node 321 in the first communication cell via one of the distributed units 311 associated with the first communication cell 301. In some cases communications for a given terminal device are routed through only one of the distributed units, but it will be appreciated that in some other implementations communications associated with a given terminal device may be routed through more than one distributed unit, for example in a soft handover scenario and other scenarios. The particular distributed unit(s) through which a terminal device is currently connected to the associated controlling node may be referred to as active distributed units for the terminal device. Thus the active subset of distributed units for a terminal device may comprise one or more than one distributed unit (TRP). The controlling node 321 is responsible for determining which of the distributed units 311 spanning the first communication cell 301 is responsible for radio communications with the terminal device 400 at any given time (i.e. which of the distributed units are currently active distributed units for the terminal device). Typically this will be based on measurements of radio channel conditions between the terminal device 400 and respective ones of the distributed units 311. In this regard, it will be appreciated that the subset of the distributed units in a cell which are currently active for a terminal device will depend, at least in part, on the location of the terminal device within the cell (since this contributes significantly to the radio channel conditions that exist between the terminal device and respective ones of the distributed units).

In at least some implementations the involvement of the distributed units in routing communications from the terminal device to a controlling node (controlling unit) is transparent to the terminal device 400. That is to say, in some cases the terminal device may not be aware of which distributed unit is responsible for routing communications between the terminal device 400 and the controlling node 321 of the communication cell 301 in which the terminal device is currently operating. In such cases, as far as the terminal device is concerned, it simply transmits uplink data to the controlling node 321 and receives downlink data from the controlling node 321 and the terminal device has no awareness of the involvement of the distributed units 311. However, in other embodiments, a terminal device may be aware of which distributed unit(s) are involved in its communications. Switching and scheduling of the one or more distributed units may be done at the network controlling node based on measurements by the distributed units of the terminal device uplink signal or measurements taken by the terminal device and reported to the controlling node via one or more distributed units.

In the example of FIG. 2, two communication cells 301, 302 and one terminal device 400 are shown for simplicity, but it will of course be appreciated that in practice the system may comprise a larger number of communication cells (each supported by a respective controlling node and plurality of distributed units) serving a larger number of terminal devices.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a terminal device, wherein the specific nature of the network infrastructure equipment/access node and the terminal device will depend on the network infrastructure for the implementation at hand. For example, in some scenarios the network infrastructure equipment/access node may comprise a base station, such as an LTE-type base station 101 as shown in FIG. 1 which is adapted to provide functionality in accordance with the principles described herein, and in other examples the network infrastructure equipment may comprise a control unit/controlling node 321, 322 and/or a TRP 311, 312 of the kind shown in FIG. 2 which is adapted to provide functionality in accordance with the principles described herein.

As is well understood, various wireless telecommunications networks, such as the LTE-based network represented in FIG. 1 and the NR-based network represented in FIG. 2, may support different Radio Resource Control (RRC) modes for terminal devices, typically including: (i) RRC idle mode (RRC_IDLE); and (ii) RRC connected mode (RRC_CONNECTED). When a terminal device transmits data, RRC connected mode is generally used. The RRC idle mode, on the other hand, is for terminal devices which are registered to the network (EMM-REGISTERED), but not currently in active communication (ECM-IDLE). Thus, generally speaking, in RRC connected mode a terminal device is connected to a radio network access node (e.g. an LTE base station) in the sense of being able to exchange user plane data with the radio network access node. Conversely, in RRC idle mode a terminal device is not connected to a radio network access node in the sense of not being able to communicate user plane data using the radio network access node. In idle mode the terminal device may still receive some communications from base stations, for example reference signalling for cell reselection purposes and other broadcast signalling. The RRC connection setup procedure of going from RRC idle mode to RRC connected mode may be referred to as connecting to a cell/base station.

Generally speaking, in RRC connected mode a terminal device is connected to radio network infrastructure equipment (e.g. a base station or a controlling node via a TRP) in the sense of being able to receive user plane data from the radio network infrastructure equipment, and in RRC idle mode the terminal device is not connected to radio network infrastructure equipment in the sense of not being able to receive user plane data via from any radio network infrastructure equipment in the network. The RRC connection setup procedure of going from RRC idle mode to RRC connected mode may be referred to as connecting to a cell/radio network infrastructure equipment.

One characteristic of the RRC connected mode is the allocation of a cell-specific radio network temporary identifier (C-RNTI) to the terminal device to allow the radio network infrastructure equipment to which the terminal device is radio connected to address communications to the terminal device. A terminal device in a conventional RRC idle mode will not be associated with this kind of RNTI.

Another characteristic of the RRC connected mode is the association of one or more dedicated logical channels with the terminal device to allow the terminal device to exchange data with the radio network infrastructure equipment to which it is connected. A terminal device in a conventional RRC idle mode will not be associated with this kind of dedicated logical communication channel.

Another characteristic of the RRC connected mode is that a terminal device in RRC connected mode will have established a security context by exchanging security settings with the radio network infrastructure equipment to which it is attached as part of its RRC connection procedure. A terminal device in a conventional RRC idle mode will not, however, have this kind of established security context.

More generally, radio network infrastructure equipment to which a terminal device is connected in RRC connected mode will retain information relating to the terminal device, for example its allocated C-RNTI, logical channel configuration settings, security settings, and so on, to allow the radio network infrastructure equipment to communicate with the terminal device. This information may generally be referred to as a terminal device context in/at the radio network infrastructure equipment.

In accordance with conventional approaches, when a terminal device releases its RRC connection with respect to a particular radio network infrastructure equipment and transitions to conventional RRC idle mode, the radio network infrastructure equipment releases the terminal device context.

Whilst in RRC idle mode a terminal device will typically still receive some signalling from radio network infrastructure equipment covering its location (i.e. radio network infrastructure equipment within radio signalling range of its location). For example, in an LTE context an idle mode terminal device will synchronise to a selected radio network infrastructure equipment and decode relevant broadcast information, for example information transmitted in master information block (MIB) and system information block (SIB) transmissions, from the selected radio network infrastructure equipment so the terminal device is able to initiate a radio resource connection with the selected radio network infrastructure equipment as and when appropriate. When a terminal device operating in an RRC idle mode wishes to transition to an RRC connected mode to exchange data with the network, it transmits an RRC connection request message to the currently selected radio network infrastructure equipment to initiate an RRC connection procedure in accordance with well-established techniques.

Thus to summarise some aspects of the RRC idle and connected modes/states, in the RRC Connected State, the network is aware of the UE's location at the cell level and has the UE context thereby allowing scheduling of physical resources for user data transmissions because the UE (terminal device) has been assigned a temporary ID (C-RNTI) which is unique to that UE within the cell and hence the UE can be directly addressed by the network. In the Idle Mode, the network is aware of the UE's location within a Tracking Area and does not have the UE context and cannot schedule physical resources for user data transmission because the UE does not have a unique identifier within a cell (C-RNTI). The UE moves from the Idle Mode to the RRC Connected State by establishing an RRC Connection which assigns a C-RNTI using a random access (RACH) procedure. The UE moves from RRC Connected State to Idle Mode by releasing its RRC Connection (and hence releasing C-RNTI).

Figure 3:
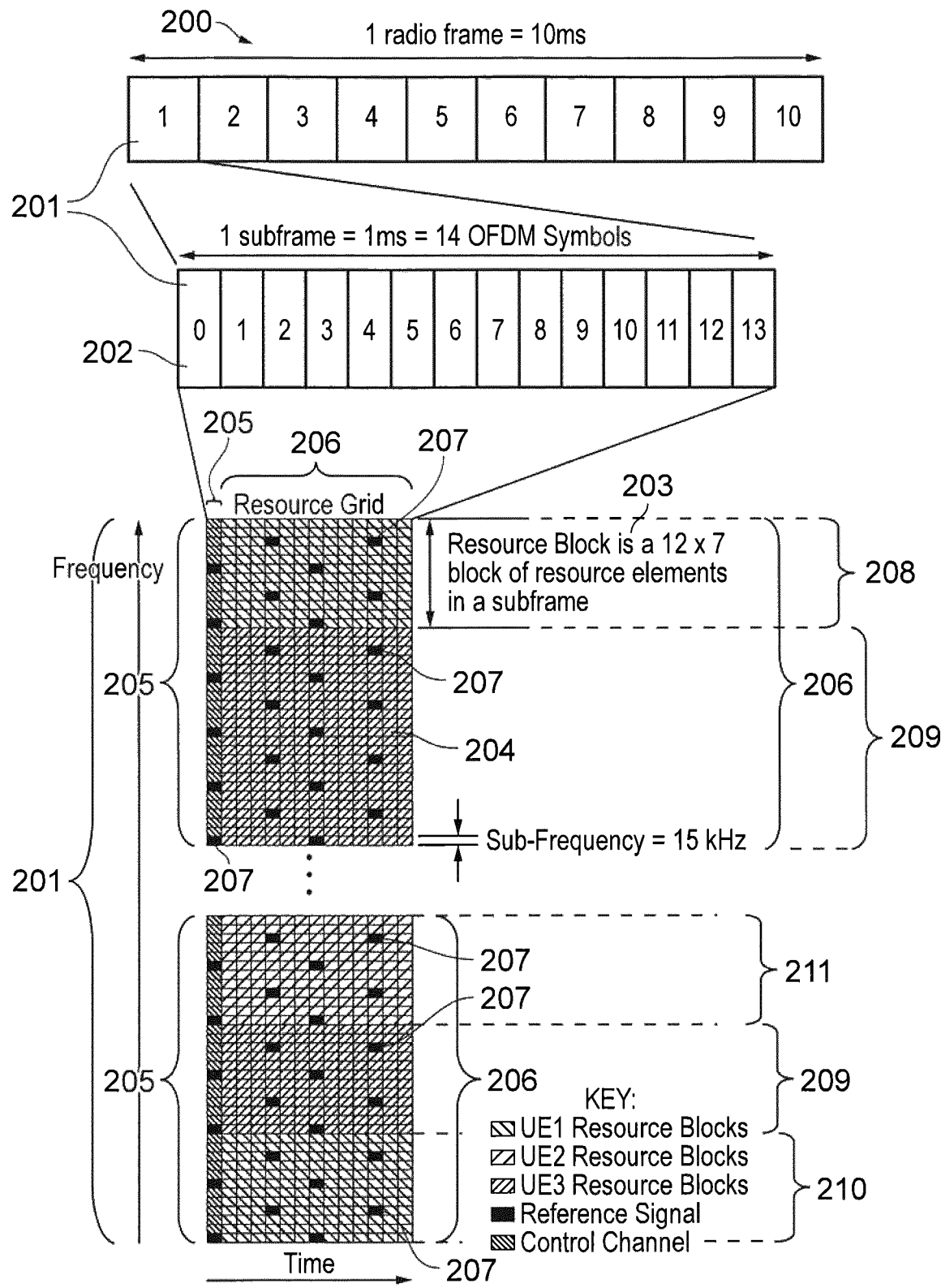
FIG. 3 provides a schematic diagram of the structure of a downlink of a wireless access interface of a mobile communications system.

In the simplified structure of the downlink of an LTE wireless access interface of FIG. 3, each subframe 201 comprises a control region 205 for the transmission of control data, a data region 206 for the transmission of user data, reference signals 207 and synchronisation signals which are interspersed in the control and data regions in accordance with a predetermined pattern. The control region 205 may contain a number of physical channels for the transmission of control data, such as a physical downlink control channel (PDCCH), a physical control format indicator channel (PCFICH) and a physical HARQ indicator channel (PHICH). The data region may contain a number of physical channels for the transmission of data, such as a physical downlink shared channel (PDSCH) and a physical broadcast channels (PBCH). Although these physical channels provide a wide range of functionality to LTE systems, in terms of resource allocation and the present disclosure PDCCH and PDSCH are most relevant. Further information on the structure and functioning of the physical channels of LTE systems can be found in [3].

Resources within the PDSCH may be allocated by an eNodeB to UEs being served by the eNodeB. For example, a number of resource blocks of the PDSCH may be allocated to a UE in order that it may receive data that it has previously requested or data which is being pushed to it by the eNodeB, such as radio resource control (RRC) signalling. In FIG. 3, a first user equipment (UE), UE1 has been allocated resources 208 and 210 of the data region 206, a second UE, UE2, has been allocated resources 211 and a third UE, UE3, has been allocated resources 209. UEs in an LTE system may be allocated a fraction of the available resources of the PDSCH and therefore UEs are required to be informed of the location of their allocated resources within the PDCSH so that only relevant data within the PDSCH is detected and estimated. In order to inform the UEs of the location of their allocated communications resources, resource control information specifying downlink resource allocations is conveyed across the PDCCH in a form termed downlink control information (DCI), where resource allocations for a PDSCH are communicated in a preceding PDCCH instance in the same subframe. During a resource allocation procedure, UEs thus monitor the PDCCH for DCI addressed to them and once such a DCI is detected, receive the DCI and detect and estimate the data from the relevant part of the PDSCH.

While the details of the new radio (NR) radio interface specifications are not yet finalised, the principles of resource allocation and signalling (including the use of a PDCCH and a PDSCH) described above are expected to broadly apply to NR wireless communications. In addition, it is expected that the NR radio interface specifications will define a group common physical downlink control channel (GC-PDCCH). The GC-PDCCH may be transmitted by the wireless communications network 300, for example by the controlling node 321, and may contain group control information transmitted by the controlling node 321 for a group of communications devices which may include the communications device 400. Multiple GC-PDCCH channels may be configured by the controlling node 321, each associated with a different group of communications devices.

The group control information transmitted on the GC-PDCCH may contain a slot format indicator (SFI), where a "slot" is a time period of specified duration and has a similar functionality to a "subframe" in LTE. The SFI may indicate the format of the slot that it resides in (that is, the slot in which the GC-PDCCH is transmitted), or it may indicate the format for a plurality of future slots, or both. For example, the SFI can indicate the slot formats for each of the ten slots that comprise a radio frame. Among other things, the SFI may indicate that a slot is "unknown" or "empty", indicating to the communications device that it should not attempt to decode that slot in the downlink;

the number of OFDM symbols used to carry downlink control channels. If the SFI indicates that zero OFDM symbols were used to carry downlink control channels in a slot, the communications device should not attempt to decode downlink control channels in that slot.

The SFI is one example of group control information that may be transmitted on the GC-PDCCH.

In some embodiments of the present technique, a GC-PDCCH is applicable to a group of communications devices, irrespective of a service (e.g. instant messaging, file download, streaming) which is being used by each of the group of communications devices.

In other embodiments, the controlling node 321 configures multiple GC-PDCCH channels. A communications device may be assigned to a particular GC-PDCCH channel based on the service or services which it is using. For example, a communications device making use of a enhanced mobile broadband (eMBB) service that is downloading files may be assigned to monitor a first GC-PDCCH whereas a communications device that is using an instant messaging service would be configured to monitor a second GC-PDCCH. In such embodiments, a communications device may be assigned to a GC-PDCCH channel based on a frequency with which data transmissions are scheduled for the communications device.

Many mobile communications devices are battery powered and as will be appreciated therefore, power consumption is a critical aspect of a mobile communications system design. In order to reduce the power consumption of mobile communication devices, one technique that is commonly used is referred to as discontinuous reception (DRX). DRX may be applied in either the RRC idle mode or in the RRC connected mode.

In the RRC connected mode, the communications device 400 may be in either an active mode or in a DRX mode. Whether the communications device 400 is in the active mode or in the DRX mode is determined based on recent transmissions to or from the communications device 400. For example, when the communications device 400 has neither received nor transmitted data from or to the controlling node 321 for a predetermined period of time, the communications device 400 may enter the DRX mode. Similarly, if, when in the DRX mode, the communications device 400 receives or transmits data from or to the controlling node 321, the communications device 400 may return to the active mode.

When in the DRX mode, the communications device 400 is allocated predetermined periods during which it is required to monitor the wireless access interface for signals transmitted to it by the controlling node 321. Outside of these periods the mobile communications device is not required to monitor (that is, to receive and attempt to decode) signals received from the controlling node 321 and may thereby reduce the power consumption associated with its receiver circuitry. A time period during which the mobile communications device is required to monitor the downlink transmissions of the controlling node 321 is referred to as a DRX on period. A time period when the communications device is not required to monitor downlink communications is referred to as a DRX off period.

When in the RRC connected mode, during each DRX on period the mobile communications device is required to monitor the physical downlink control channels in every subframe or slot. Therefore the controlling node 321, when it wishes to transfer data to the communications device on a PDSCH, will schedule the downlink transmissions to start within a DRX on period of the communications device. It will be readily apparent that the DRX on periods and DRX off periods for a given communications device, such as the communications device 400, must be known to both the communications device and the controlling node 321.

If, when the communications device 400 wakes up at the start of the DRX on period and starts to monitor the PDCCH channel, it detects an indication that data is scheduled for it on a PDSCH, then the communications device 400 will decode the indicated PDSCH resources and thereby receive the data transmitted to the communications device by the controlling node 321. The DRX on period may span several subframes (for example, four subframes) in which case the communications device 400 must have its receiver enabled in order to decode the PDCCH channel during each of these subframes.

Although the use of DRX can significantly reduce the power consumption of the communications device 400 compared with a mode of operation in which the communications device 400 is required to continuously monitor the PDCCH, that is in every subframe, there is a desire to further reduce the power consumption associated with the reception of downlink data and signalling. This is particularly relevant for devices which receive very little data because, even with the use of DRX, there may be many DRX on periods when the communications device 400 must wake up and subsequently determines that no downlink transmissions are scheduled for it using a PDSCH during the DRX on period.

Therefore it has been proposed that a wake up signal (WUS) could be transmitted in advance of the DRX on period, and the wake up signal would indicate whether one or more PDCCHs are active during the subsequent DRX on period. If the WUS indicates that there are no active PDCCHs in the DRX on period then the communications device can skip reception of the DRX on period, which means that it is able to disable portions of its receiver functionality and thereby save power compared to conventional techniques in which the communications device must enable its receiver for the entire duration of every DRX on period.

There is, therefore, a desire to design a wake up signal transmission mechanism which provides a low overhead but efficient means of communicating to communications devices that they should enable, or power on, their receiver during a subsequent DRX on period in order to receive a PDCCH signalling within that DRX on period.

Figure 4:
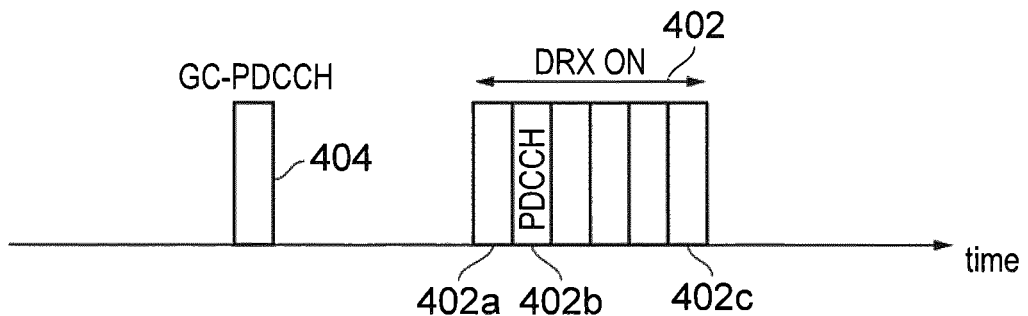
FIG. 4 illustrates a time sequence comprising a group common control channel acting as a wake up signal and a DRX on period in accordance with an embodiment of the present technique.

FIG. 4 illustrates a wake up signal in accordance with embodiments of the present technique in which the wake up signal is communicated using the GC-PDCCH channel. In FIG. 4, a DRX on period 402 associated with the communications device 400 comprises a plurality of slots 402a, 402b, 402c. The DRX on period 402 is preceded by a transmission on a GC-PDCCH 404. According to embodiments of the present technique group control information transmitted in the instance of the GC-PDCCH 404 includes an indication that at least one of the time slots 402a 402b and 402c includes an active PDCCH.

Figure 5:
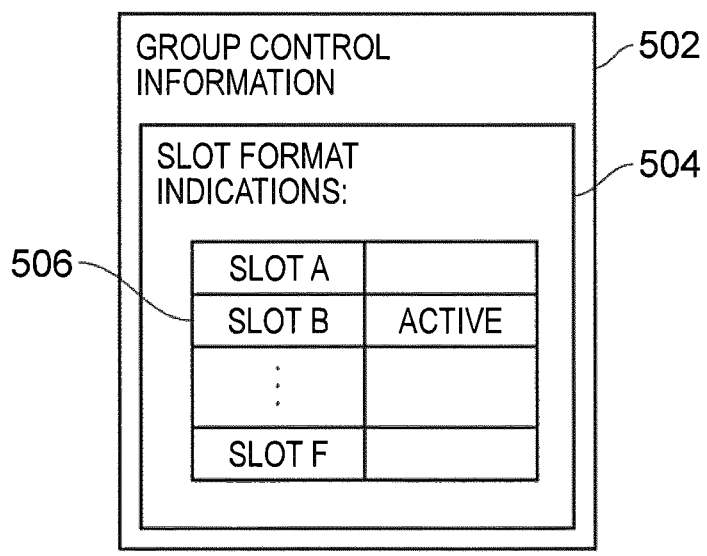
FIG. 5 illustrates an example of the group control information transmitted using the GC-PDCCH in accordance with an embodiment of the present technique.

An example of the group control information transmitted using the GC-PDCCH 404 is illustrated in FIG. 5. In FIG. 5 the group control information 502 which is transmitted using the GC-PDCCH 404 includes a slot format indicator (SFI) 504 corresponding to a plurality of time slots. The SFI is an example of group control information. The slot format indication 504 includes an indication 506 that a PDCCH is active, that is, that the slot may contain a PDCCH transmission, during one of the plurality of time slots. In some embodiments, the SFI provides the indication 506 that a PDCCH is active in addition to the information conventionally conveyed by the SFI as described above.

In some embodiments of the present technique the group of slots for which the slot format indicator 504 is included in the group control information 502 provides information is the same as the group of slots 402a, 402b, 402c which make up the DRX on period 402 associated with the communications device 400.

In other embodiments the slot format indicator 504 corresponds to a plurality of time slots including the time slots 402a, 402b, 402c making up the DRX on period 402. In other words, the slots 402a, 402b, 402c which make up the DRX on period 402 may be a subset of the slots for which the slot format indicator 504 provides group control information. In some embodiments, the slot format indicator 504 may provide group control information associated with the slots making up a plurality of consecutive and contiguous DRX on periods, the consecutive and contiguous DRX on periods being the DRX on periods associated with two or more different communications devices.

According to embodiments of the present technique the communications device 404 is configured with DRX parameters and is configured to monitor one or more GC-PDCCHs. The communications device 400 determines the start time of the DRX on period 402 and, based on a schedule of the transmissions of a GC-PDCCH channel which it is configured to monitor, determines a start time of the transmission using the GC-PDCCH channel 404. The communications device 400 therefore enables, or powers on, its receiver to receive and to decode the transmissions on the GC-PDCCH 404. Having received and decoded the group control information 502 transmitted on the GC-PDCCH 404 it determines that the slot in which the slot format indicator 504 indicates that a PDCCH is active is the slot 402b. If the slots which make up the DRX on period 402 are not the same set of slots as the slots for which slot format information is provided by the slot format indicator 504, the communications device 400 further determines that the slot 402b falls within the DRX on period 402.

In some embodiments, the slot format indicator (SFI) 504 may be a sequence of bits, in which each bit is associated with a single slot, which may be a current slot (i.e. the one in which the GC-PDCCH transmission occurs) or a future slot. A value of '1' may indicate that the corresponding slot is active and may contain a PDCCH transmission. Based on this determining the communications device 400 then powers on, and enables, its receiver to receive and to decode PDCCH signals transmitted during the time slot 402b. Based on the received PDCCH transmission in slot 402B the communications device 400 determines whether it indicates any downlink transmission scheduled for transmission by the controlling node 321 for the communications device 400 during the time slot 402b, and receives any such downlink communications transmitted using, for example a PDSCH.

In the example shown in FIG. 4 and FIG. 5 the group control information 502 transmitted on the GC-PDCCH 404 indicates to the communications device 400 that a PDCCH is active during the time slot 402b. However, if the slot format indictor 504 within the group control information 502 transmitted using the GC-PDCCH 404 had indicated that no PDCCH was active during any of the time slots 402a, 402b, 402c within the DRX on period 402, then the communications device 400 could temporarily disable functionality of, or power down, its receiver since it is not required to attempt to decode any PDCCH signals during the DRX on period 402.

It will therefore be appreciated that the use of the GC-PDCCH as a means of transmitting a wake up signal fulfils the requirement of providing a means for the communications device 400 to remain in a low power mode of operation during a DRX on period, such as the DRX on period 402, when the controlling node 321 does not have any downlink traffic scheduled for transmission to the communications device 400 during the DRX on period 402.

Furthermore, even when transmissions are scheduled for the communications device 400 during one or more of the slots 402a, 402b, 402c within the DRX on period 402, the communications device 400 may control its receiver to be in a low power configuration such that it does not attempt to decode a PDCCH in the slots 402a, 402c within the DRX on period 402 where no transmission is scheduled for the communications device 400.

In the embodiment illustrated in FIG. 4 and FIG. 5, the communications device 400 is shown as being in the DRX mode, and the GC-PDCCH is therefore applicable to at least a communications device which is in the DRX mode.

In some embodiments, a GC-PDCCH may be exclusively for communications devices which are in the DRX mode; that is, a communications device is configured to receive transmissions on the GC-PDCCH only if it is in the DRX mode.

In some embodiments, a GC-PDCCH channel may provide information for communications devices which are in the active mode and communications devices which are in the DRX mode. In such embodiments, the GC-PDCCH may provide group control information which is interpreted based on whether the communications device is in the active mode or in the DRX mode.

For example, in some embodiments, each of two binary bits are associated with each slot within the slot format indicator 504, and the bits are interpreted by the communications device, when in the active mode, as follows:

| SFI bit sequence | Communications device behaviour |
| --- | --- |
| 00 (DL active) | Decode PDCCH in slot |
| 01 (unknown) | Do not decode PDCCH in slot (e.g. slot is an UL slot) |
| 10 (DRX_on active) | Decode PDCCH in slot |

When in the DRX mode, the bits are interpreted as follows:

| SFI bit sequence | Communications device behaviour |
| --- | --- |
| 00 (DL active) | Do not decode PDCCH |
| 01 (unknown) | Do not decode PDCCH |
| 10 (DRX_on active) | Decode PDCCH in slot if UE is configured to monitor the DRX_on period |

In some further embodiments, the SFI bit sequence may provide different information to different groups of communications devices. For example, the behaviours of a communications device in the DRX mode in the case of SFI bit sequence='10' and '11' may be as follows:

| SFI bit sequence | Communications device behaviour |
| --- | --- |
| 10 (DRX_on active for all groups) | Decode PDCCH in slot if UE is configured to monitor the DRX_on period, regardless of group |
| 11 (DRX_on active for group 1) | Decode PDCCH in slot if UE is configured to monitor the DRX_on period and UE is configured to be in "group 1" |

The above embodiments provide finer granularity of active slot information for a communications device which is not in group 1. That is, there is a lower likelihood of a 'false positive' active slot indication for such a device, since it is less likely to attempt to decode a PDCCH which contains no scheduling information which is relevant to it. As a result, devices in groups other than group 1 can be expected to achieve greater power consumption reduction than devices in group 1. In some embodiments, therefore, devices which are configured to monitor a particular GC-PDCCH channel are further assigned to sub-groups based on a power efficiency requirement, which may be based on, for example, a characteristic of a power supply associated with the device. Examples of the characteristic may be a battery life, a battery capacity, or whether they are connected to a permanent power supply.

As will be appreciated therefore, the slot format indicator provides an example of group control information transmitted on the group control channel which provides a wake up signal when the communications device would otherwise be in the DRX off period.

In some embodiments, a communications device which is in the active mode is configured to monitor only a single GC-PDCCH. In some embodiments, a communications device may be configured to monitor a plurality of GC-PDCCHs, one of which may be a global GC-PDCCH which a communications device is configured to monitor regardless of whether it is in the DRX mode or in the active mode.

In some embodiments, a GC-PDCCH channel is configured for each of a plurality of groups of communications devices in the DRX mode. The devices within each group may be configured with DRX parameters such that their DRX on periods coincide. The devices in two or more groups may be configured with DRX parameters such that their DRX on periods coincide. In such embodiments, the controlling node 321 is able to indicate to only a subset of the communications devices which are in the DRX mode that they should monitor a slot for a PDCCH transmission, even though the slot may be within a DRX on period of the other devices (not in the subset).

In the example embodiment illustrated in FIG. 4, the GC-PDCCH transmission 404 precedes the DRX on period 402. In some other example embodiments, the GC-PDCCH transmission 404 occurs within the first time slot 402a of the DRX on period 402. In such embodiments, the group control information 502 may contain the slot format indicators 504 which contains group control information indicating, for each slot, or for each of a group of slots, within the DRX on period 402, whether a PDCCH is scheduled and the slots are thus 'active'. Alternatively, in such embodiments, the group control information 502 may indicate whether or not any of the slots within the DRX on period 402 are scheduled to include a PDCCH transmission.

As described above, in some embodiments the controlling node 321 configures multiple GC-PDCCH channels and assigns the communications device 400 to a particular GC-PDCCH channel based on the service or services which it is using, or based on the nature of the traffic associated with the services currently used by the communications device 400. A GC-PDCCH assigned to a communications device which is downloading files may indicate a high proportion of slots as being active; whereas a GC-PDCCH assigned to communication devices 400 which are using services requiring fewer and more sporadic data transmissions would likely indicate fewer slots as being active. Such embodiments may thus reduce a likelihood that the communications device 400 will be required to receive and to decode a PDCCH which does not contain any scheduling information which is relevant to the communications device 400.

Figure 6:
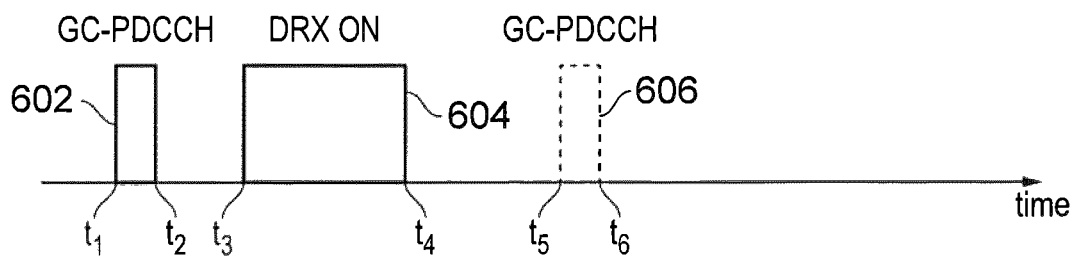
FIG. 6 illustrates a time sequence comprising a first GC-PDCCH instance, a DRX on period and a second GC-PDCCH instance in accordance with an embodiment of the present technique.

FIG. 6 illustrates a time sequence comprising a first GC-PDCCH instance 602, a DRX on period 604 and a second GC-PDCCH instance 606. In accordance with some embodiments of the present technique the communications device 400 may receive from the controlling node 321 a schedule providing information regarding the transmission schedule for the GC-PDCCH channel. The communications device 400 may be determine based on the transmission schedule, for example, that the GC-PDCCH channel is to be transmitted at times indicated at 602 and 606 in FIG. 6. In order to conserve energy and make efficient use of the GC-PDCCH the communications device 400 determines which instance or instances of the GC-PDCCH to receive based on its DRX on period configuration.

For example, as shown in FIG. 6, the communications device 400 determines that the DRX on period 604 starts at a time t3 and determines that the GC-PDCCH transmission preceding the DRX on period 604 commences at a time t1. Based on this determination the communications device 400 enables its receiver (powers on) to receive and to decode the GC-PDCCH instance 602 starting at the time t1, in order to determine whether one or more of the time slots falling within the DRX on period 604 contains an active PDCCH channel.

In contrast the communications device 400 determines, in respect of the GC-PDCCH transmission at 606, that this does not precede a DRX on period (or that there is a subsequent GC-PDCCH transmission scheduled which occurs before a next DRX on period) and therefore the communications device 400 does not control its receiver (power on) to receive and to decode the signals of the GC-PDCCH during the transmission of the GC-PDCCH at 606 beginning at a time t5.

Figure 7:
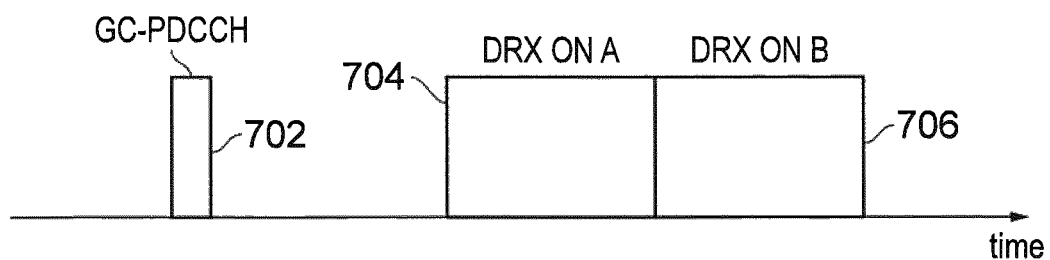
FIG. 7 provides a time sequence showing a transmission of a GC-PDCCH followed by two DRX on periods in accordance with an embodiment of the present technique
Figure 8:
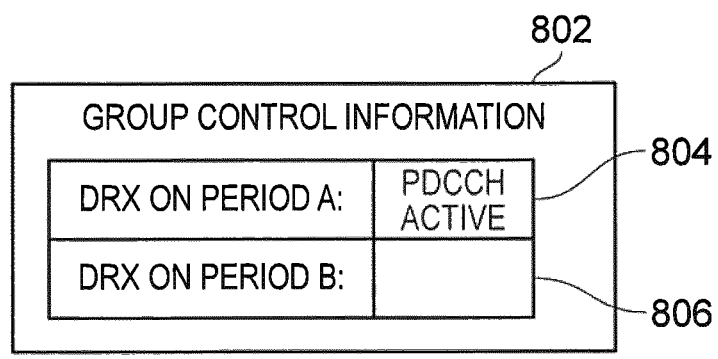
FIG. 8 illustrates an example of group control information transmitted using a GC-PDCCH in accordance with an embodiment of the present technique.

FIG. 7 and FIG. 8 illustrate a further example embodiment in accordance with the present technique. FIG. 7 shows a time sequence showing a transmission of the GC-PDCCH at 702 followed by two DRX on periods: DRX on period A 704 and DRX on period B 706. Different communications devices may be configured with different DRX parameters and thereby may have different DRX on periods. For example the communications device 400 may be configured with the DRX on period A 704 while a different communications device may be configured with the DRX on period B 706. In the example embodiment shown in FIG. 7 the GC-PDCCH transmission 702 comprises group control information shown at 802 in FIG. 8 which includes a plurality of DRX active indicators 804, 806, each of which indicates for the associated DRX on periods—the DRX on period A 704 and the DRX on period B 706—whether at least one of the time slots within the respective DRX on period includes a PDCCH transmission.

An example of the group control information 802 transmitted during the GC-PDCCH instance 702 is shown in FIG. 8. This shows that the group control information 802 includes the DRX active indication 804 in respect of the DRX on period A 704. Conversely the group control information 802 indicates that, in respect of the DRX on period B 706, there is no active PDCCH transmitted during any of the time slots within the DRX on period B 706 by means of the second DRX active indicator 806. The GC-PDCCH transmission 702 thereby contains a very compact form of wake up signal information comprising a single indication in respect of each of one or more DRX on periods. FIG. 7 shows two DRX on periods 704, 706 being controlled by a GC-PDCCH instance that includes two DRX active indications, where each DRX on period is controlled by a corresponding DRX active indication. It will be apparent that the present technique is also applicable to the case where a single DRX on period is controlled by a single DRX active indication or to the case where a plurality of DRX on periods are controlled by a single DRX active indication. In other words, the scope of the present disclosure is not limited to a particular number of DRX on periods (which may be one or more) for which an associated DRX active indication is transmitted in group control information on a GC-PDCCH instance.

The communications device 400 which receives and decodes the GC-PDCCH transmission 702 is therefore able to determine based on the group control information 802 communicated during the GC-PDCCH transmission 702 that at least one time slot during the DRX on period A 704 includes a PDCCH. Based on this determination, the communications device 400 therefore enables its receiver to receive and to decode the transmissions from the controlling node 321 during each of the time slots which comprise the DRX on period A 704 in order to receive and to decode any PDCCH communications which may occur during the DRX on period A 704.

Then, as in the example illustrated in FIG. 4 and FIG. 5, once the communications device 400 successfully decodes a PDCCH within one of the time slots during the DRX on period A 704 it is able to appropriately control its receiver to decode and to receive any downlink data or control information scheduled for transmission to the communications device 400 by means of, for example, a PDSCH.

In contrast a communications device which is configured with the DRX on period B 706 and which receives the GC-PDCCH transmission 702 containing the group control information 802 is able to determine based on the indication 806 that no PDCCH is active during the DRX on period B 706 and therefore is able to control its receiver to maintain a low power mode of operation during the DRX on period B 706, since it is able to determine that it is not required to monitor any of the time slots within the DRX on period B 706 since the controlling node 321 has not scheduled any data or control transmissions during any of the time slots within the DRX on period B 706.

In some embodiments, a DRX active indicator is transmitted for each of a plurality of DRX on periods and comprises a single bit to indicate whether or not at least one of the time slots within the associated DRX on period includes a PDCCH transmission.

In some embodiments, communications devices having differing DRX on periods may therefore be configured to monitor a single GC-PDCCH, if the GC-PDCCH provides DRX active indicators for each of the DRX on periods configured for the communications devices in the group.

Each of the DRX active indicators 804, 806 of FIG. 8 provide an indication at the granularity of a DRX on period. However, in some embodiments, the DRX active indicators 804, 806 may provide indications at a per-slot granularity. In some embodiments, the DRX active indicators 804, 806 may comprise a bitmap indicating, at a symbol level, the scheduled time for a PDCCH.

Instead of, or combined with, DRX on periods, different communications devices may be configured with different search spaces, and the DRX active indicators 804, 806 may provide an indication as to which, if any, search spaces are active, i.e., are scheduled to contain a PDCCH transmission. Based on such an indication, if the communications device 400 determines from the DRX active indicators 804, 806 that no PDCCH transmission is scheduled for a search space for which it is configured, then the communications device 400 may configure its receiver to operate in a low power mode whereby it does not attempt to receive and to decode any PDCCH transmissions during the DRX on period.

As will be appreciated therefore, the DRX active indicator provides another example of group control information transmitted on the group control channel which provides a wake up signal when the communications device would otherwise be in the DRX off period.

Figure 9:
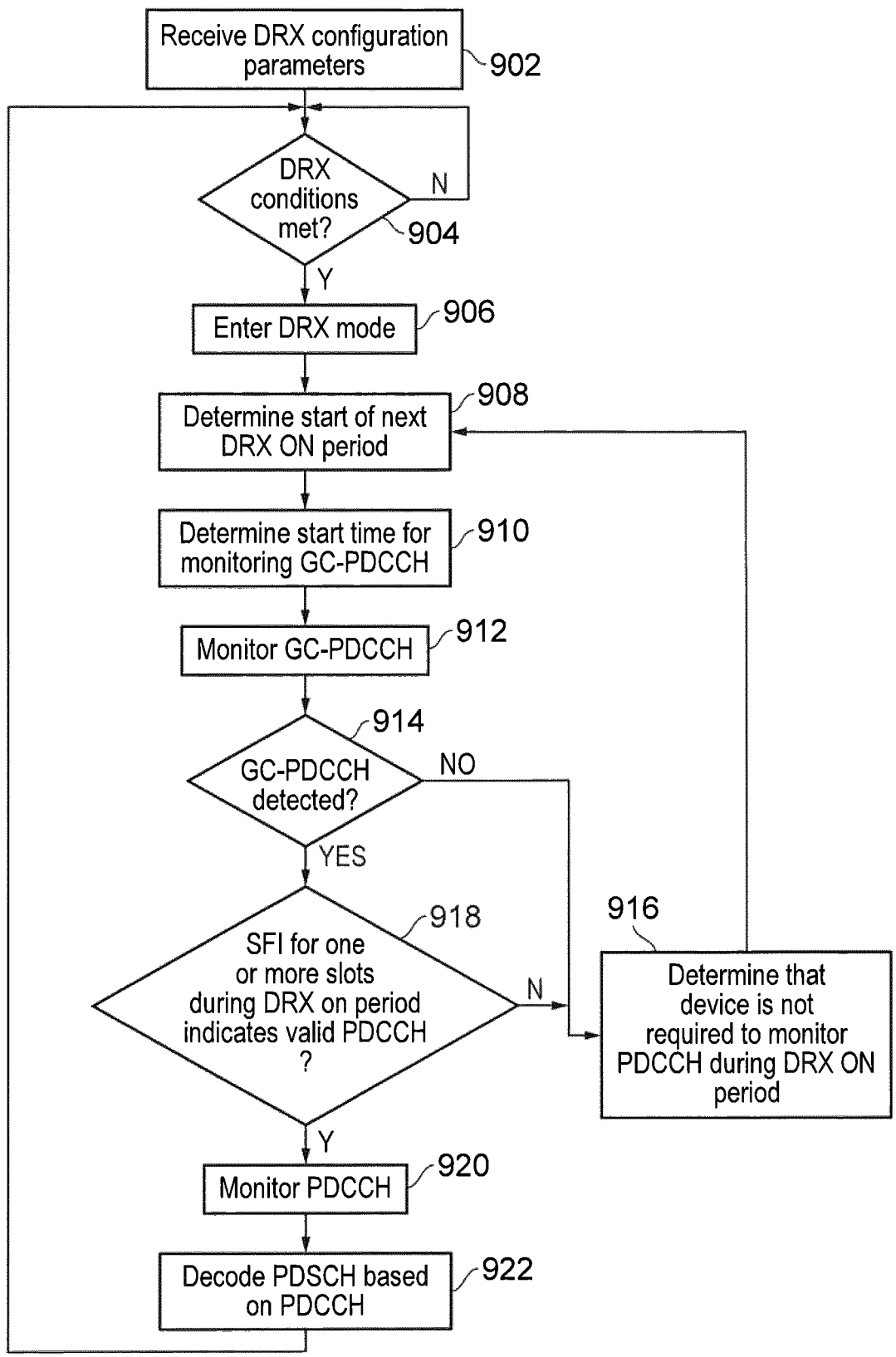
FIG. 9 is a flow chart for a process carried out by a communications device in accordance with an embodiment of the present technique.

FIG. 9 is a flow chart for the controller circuitry of the communications device 400 in accordance with embodiments of the present technique. The process illustrated in FIG. 9 starts at step 902 in which the communications device 400 receives configuration parameters from the controlling node 321 enabling the communications device 400 to determine the time periods corresponding to DRX on periods during which the controlling node 321 will schedule any transmissions for the communications device 400 in the event that the communications device 400 is in a DRX mode.

The DRX configuration parameters may be received, for example, as part of a radio resource control, RRC, configuration procedure which may occur when transitioning from the RRC idle mode to the RRC connected mode. The DRX configuration parameters may include a DRX on duration and a DRX period.

While in the RRC connected mode the communications device 400 evaluates whether or not conditions for entering the DRX mode are met at step 904. If the conditions are not met then the communications device 400 remains in the active mode and control passes back to 904 periodically. If at 904 the communications device 400 determines that the conditions for entering the DRX mode are met then control passes to step 906 at which the communications device 400 enters DRX mode.

As described above, when in the DRX mode, the communications device is not required to monitor control channels continuously but is permitted to operate its receiver in a low power mode of operation according to which it is not capable of receiving and decoding, for example, the PDCCH channel within each time slot.

At step 908 the communications device 400 determines, based on the DRX configuration parameters received in step 902, the start of its next DRX on period during which the controlling node 321 may schedule downlink transmissions using a shared channel and may indicate the scheduling of the downlink transmissions using the PDCCH within one of the time slots making up the DRX on period. The DRX on period may be, for example, the DRX on period 402 of FIG. 4.

At step 910, the communications device 400 determines the start time for monitoring the GC-PDCCH based on the determined start time of the DRX on period 402 and on the GC-PDCCH transmissions schedule. As described above the GC-PDCCH transmission schedule may be communicated to the communications device 400 or alternatively it may be specified for example in the corresponding standards associated with the GC-PDCCH. The GC-PDCCH transmission may be, for example, the GC-PDCCH transmission 404 of FIG. 4.

Having determined the start time for monitoring the GC-PDCCH transmission 404, then at step 912 the communications device 400 controls its receiver to receive and to decode the GC-PDCCH signals 404 at the GC-PDCCH scheduled transmission time and at step 914 determines whether in fact signals associated with the GC-PDCCH were detected.

In some embodiments of the present technique the transmission of any given instance of the GC-PDCCH (such as the GC-PDCCH transmission 404) may be optional for the controlling node 321, and therefore in some embodiments at step 914 the communications device 400 may determine whether in fact the GC-PDCCH was transmitted.

If the communications device 400 determines that signals received did not correspond to the GC-PDCCH then it follows the NO branch to step 916 and determines that the communications device 400 is not required to monitor any of the time slots during the DRX on period 402. Alternatively or equivalently it may determine that the controlling node 321 has not scheduled any downlink transmissions during the DRX on period 402 and therefore the communications device 400 is not required to monitor and to decode the PDCCH within any of the time slots 402a, 402b, 402c within the DRX on period 402.

Returning to step 914, if the GC-PDCCH has been detected then the flow follows the YES branch to step 918. In step 918 the communications device 400 evaluates whether the slot format indicator (which may be the slot format indicator 504 of FIG. 5) for one or more of the slots 402a, 402b, 402c which fall within the DRX on period 402 indicates that the slot is valid and may therefore contain a PDCCH transmission.

If the slot format indicator 504 received in the group control information 502 transmitted on the GC-PDCCH 404 indicates that no valid PDCCH will be transmitted during the DRX on period 402 then control passes to step 916 which is described above.

Alternatively, if a slot is indicated as containing a PDCCH, and that slot falls within the DRX on period 402 then control passes to step 920. At step 920 the communications device 400 controls its receiver to receive and to decode signals (powers on) associated with the PDCCH during the one or more time slots within the DRX on period 402 in which a valid PDCCH may be transmitted, based on the slot format information 504 received on the GC-PDCCH 404.

Control passes to step 922 in which the communications device 400, having decoded any valid PDCCH information in step 920 then controls its receiver to receive and to decode any downlink transmissions scheduled for transmission to the communications device 400 using a PDSCH as indicated by the respective PDCCH.

Following step 922, the communications device 400 then returns to step 904 which has been described above. If no valid PDCCH information is detected in step 920, or if the PDCCH transmission does not indicate any scheduled downlink transmissions for the communications device 400, the control may pass directly from step 922 to 904. This may occur because, for example, controlling node 321 may transmit group control information which was based on a schedule which was subsequently amended, or was based on a tentative or estimated schedule. In the case where the communications device 400 determines that it is not required to monitor and to decode time slots within its DRX on period, then following step 916, the communications device 400 remains in the DRX mode in which case the receiver is powered down, and control passes to step 908 where it determines the start of the next DRX on period as already described above.

Figure 10:
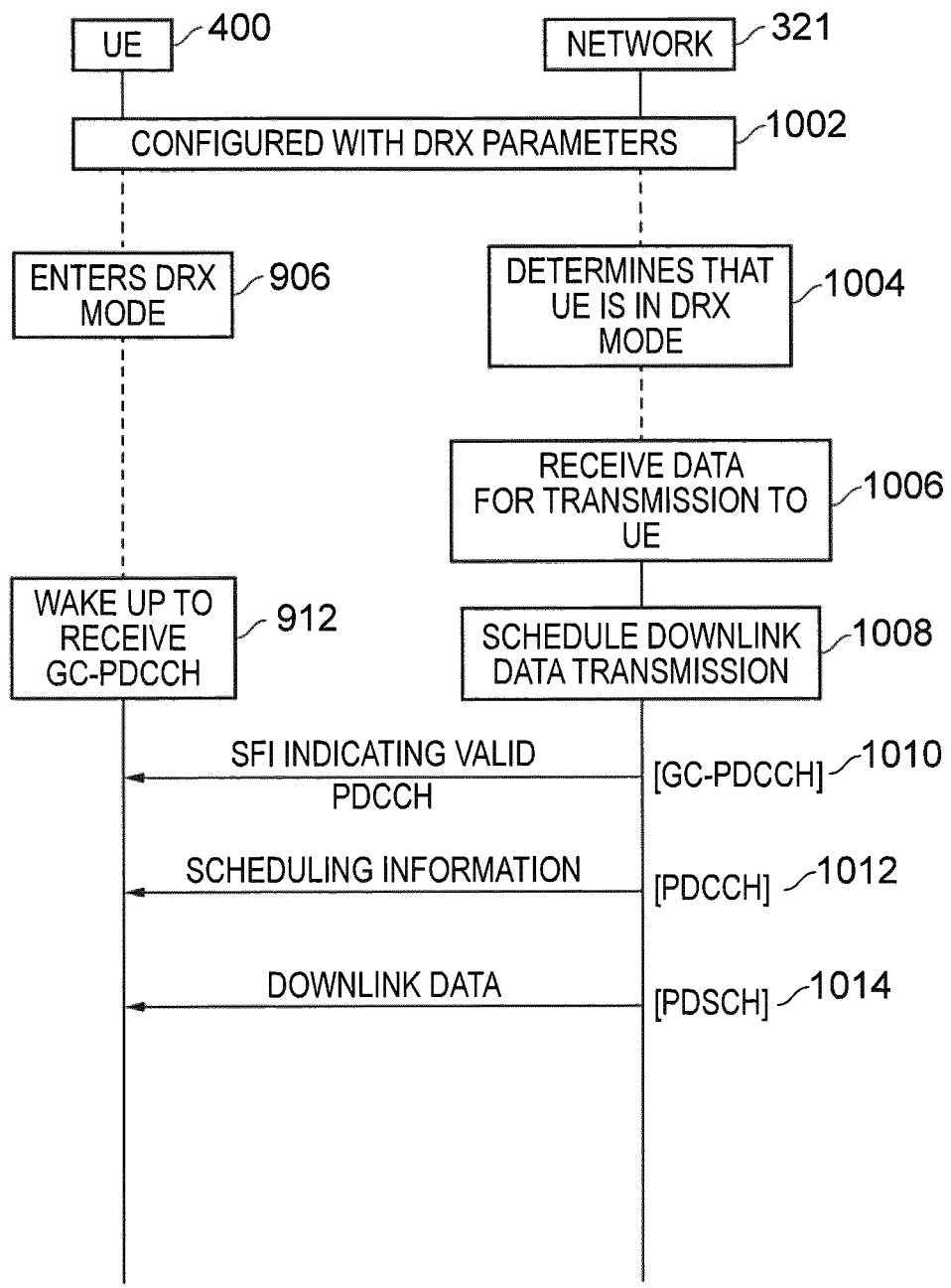
FIG. 10 is a message sequence chart indicating the interaction between a communications device or user equipment and a controlling node of a wireless communications network in accordance with an embodiment of the present technique.

FIG. 10 illustrates a message sequence chart indicating the interaction between the communications device or user equipment 400 and the controlling node 321 of the wireless communications network 300 in accordance with embodiments of the present technique.

At step 1002 the communications device 400 is configured with DRX parameters as described in step 902 of FIG. 9. Subsequently, as described above in respect of FIG. 9, the communications device 400 may enter the DRX mode at step 906 and may subsequently then enable its receiver to receive a GC-PDCCH transmission at step 912. Intermediate steps carried out by the communications device 400 are omitted for clarity.

Accordingly the controlling device 321 of the wireless communication network 300 determines at step 1004 that the communications device 400 has entered DRX mode. At step 1006 the controlling device 321 receives data for transmission to the communications device 400. Steps 1004 and step 906 may occur substantially simultaneously; alternatively, step 1004 may occur after, and in response to step 1006.

At step 1008 the controlling device 321 schedules a downlink transmission of the data to the communications device 400. Because the controlling device 321 has determined at step 1004 that the communications device 400 is in DRX mode, it is constrained to schedule the downlink transmission of the data at step 1008 using a slot which falls within a subsequent DRX on period (such as the DRX on period 402 of FIG. 4) of the communications device 400. The slot may thus be, for example, the slot 402b of FIG. 4.

In order to ensure that the communications device 400 enables its receiver and decodes the PDCCH during the slot 402b which will include the scheduling information for the downlink data transmission, the controlling device 321 at step 1010 transmits group control information on the GC-PDCCH (which may be the GC-PDCCH transmission 404 of FIG. 4) including a slot format indicator 504 indicating that a valid PDCCH will be transmitted during the slot 402b where the data is scheduled to be transmitted.

At step 1012 the controlling node 321 transmits the scheduling information using the PDCCH of the slot 402b and, consistent with the scheduling information, transmits the downlink data for the communications device at step 1014 using a PDSCH during the slot 402b. Accordingly the communications device 400, following for example a process as illustrated and described in respect of FIG. 9 above, receiving the GC-PDCCH transmission 1010 determines that a valid PDCCH is to be transmitted during at least one time slot within the DRX on period 402 and enables its receiver to receive and to decode the PDCCH transmission 1012 and hence the downlink data transmitted on the PDSCH 1014.

Figure 11:
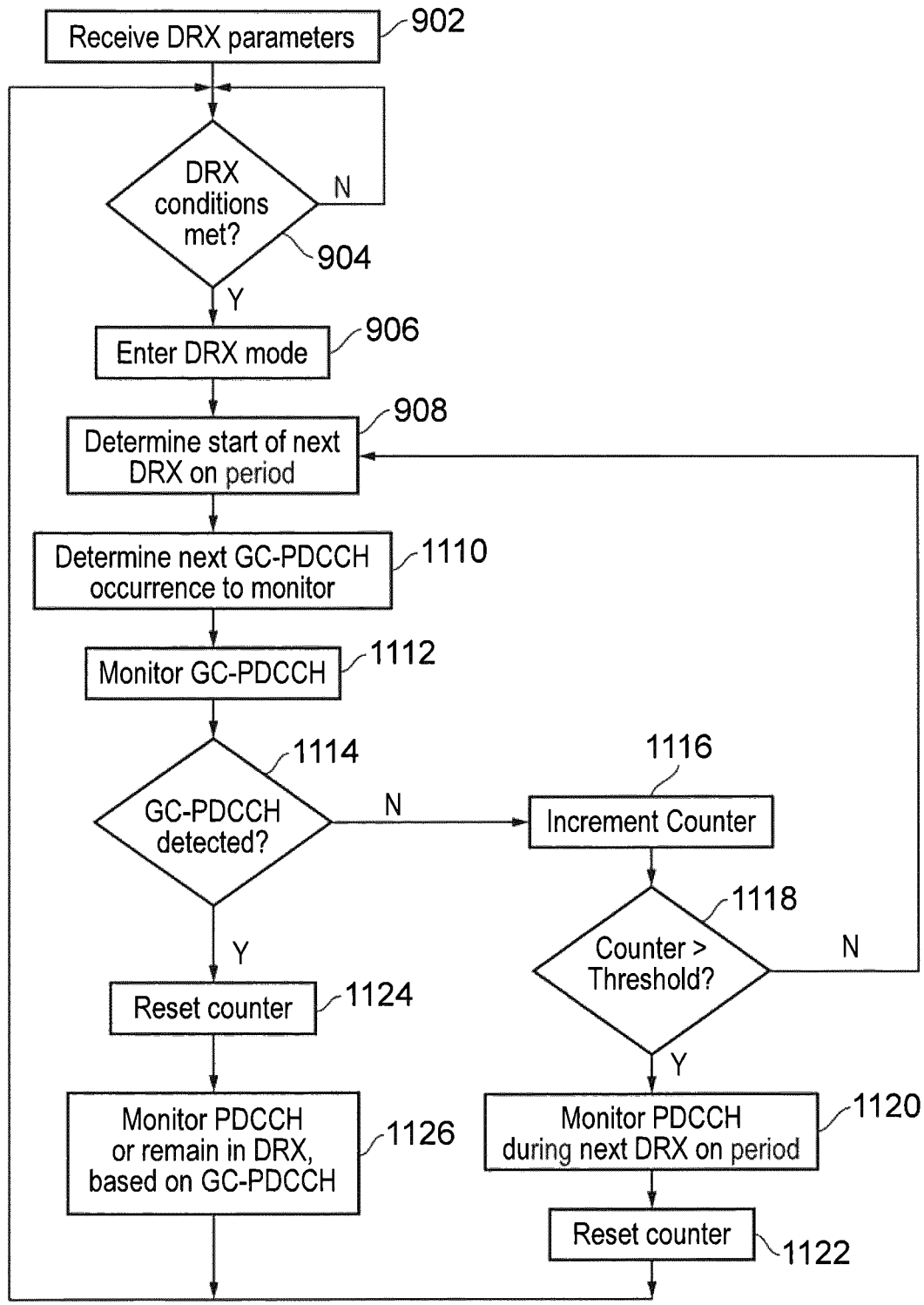
FIGS. 11 and 12 are flow charts for processes carried out by a communications device in accordance with various embodiments of the present technique.

FIG. 11 illustrates a flow chart for a process which may be implemented by the controller of the communications device 400 in accordance with some embodiments of the present technique. In some embodiments of the present technique a wake-up signal may be an instance of the GC-PDCCH and the group control information, such as the group control information 502, transmitted in the GC-PDCCH transmission 404. However, the transmission of a wake up signal may be optional for the controlling node 321. Therefore, according to some embodiments, the communications device 400 may infer, from determining that the GC-PDCCH signals were not received, that no group control information was transmitted by the controlling node 321, and may therefore control its receiver (i.e. may power up, or power down its receiver) during a subsequent DRX on period, such as the DRX on period 402, accordingly.

However, there is a possibility that the group control information was transmitted on the GC-PDCCH by the controlling node 321 but was not successfully received and decoded by the communications device 400. Therefore, according to some embodiments of the present technique an operation is provided whereby the communications device 400 maintains a counter corresponding to a number of GC-PDCCH instances where it has not been able to detect the GC-PDCCH transmissions.

This counter may be incremented for each successive GC-PDCCH instance which the communications device 400 unsuccessfully attempts to decode, that is, where the communications device 400 has controlled its receiver to receive and to decode signals based on a transmission schedule for the GC-PDCCH but the receiver was unable to successfully detect or decode the group control information transmitted on the GC-PDCCH.

The process shown in FIG. 11 starts with steps 902, 904, 906 and 908 which correspond to the correspondingly numbered steps in FIG. 9, and the descriptions for which will not be repeated. At step 1110, the communications device 400 determines the occurrence of the next GC-PDCCH transmission which it is to monitor (which may be the GC-PDCCH transmission 404) based on the determined start of the next DRX on period (which may be the DRX on period 402). At step 1112 the communications device 400 controls its receiver to receive signals where (in time and frequency) it expects the GC-PDCCH transmissions to occur and controls its receiver to attempt to receive and to decode the group control information transmitted on the GC-PDCCH. At step 1114 the communications device 400 determines whether in fact the GC-PDCCH was successfully detected or decoded.

If it was not then control passes to step 1116 at which the communications device 400 increments a counter representing the number of consecutive attempts to decode GC-PDCCH instances where it has failed to detect a correct GC-PDCCH signal. Control then passes to step 1118 at which the communications device 400 determines whether the counter has exceeded a predetermined threshold.

If the counter has exceeded the predetermined threshold then control passes to step 1120 in which the communications device 400 controls its receiver to monitor the PDCCH instances during each of the time slots within its next DRX on period.

This behaviour may be equivalent to the behaviour of the communications device 400 following a determination based on group control information received on the GC-PDCCH that a valid PDCCH signal will be transmitted during one or more of the slots during the next DRX on period.

Optionally, following step 1120 the communications device 400 may reset the counter at step 1122.

Returning to step 1118, if the counter is determined not to have exceeded the predetermined threshold then control returns to step 908.

Returning to step 1114, if the communications device 400 determines that it has been able to detect and to decode the group control information from the GC-PDCCH then control passes to step 1124 in which the counter is reset to zero. Control then passes to 1126. At step 1126 the communications device 400 either attempts to detect and decode a PDCCH transmission or remains in DRX mode, based on the contents of the group control information received at step 1112.

Following steps 1122 and 1126 the process returns to step 904 if the communications device received downlink scheduled data within the DRX on period. Alternatively, if no downlink data or communications was received from the controlling node 321 during the DRX on period then control may pass directly to step 908, that is, the communications device 400 may consider itself still within the DRX mode following steps 1122 or 1126.

By means of such embodiments, the communications device 400 may ensure that a delay in receiving scheduling information, caused by successive incorrect determinations that no GC-PDCCH transmission has occurred, can be accordingly reduced.

In response to determining that the communications device 400 has not received successive PDCCH scheduling information transmitted by the controlling node 321 for the communications device 400, the controlling node 321 may, according to some embodiments of the present technique, determine that the communications device 400 has failed to detect or to decode successfully successive GC-PDCCH transmissions. In response to making this determination, the controlling node 321 may then determine that, in accordance with a process such as that illustrated in FIG. 12 and described above, the communications device 400 will attempt to decode the PDCCH transmissions during a DRX on period governed by the value of the threshold. The controlling node 321 may therefore transmit scheduling information using a PDCCH during the determined DRX on period, thereby ensuring that reliable communications is maintained with the communications device 400.

In response to determining that the communications device 400 has failed to detect or to decode successfully successive GC-PDCCH transmissions, the controlling node 321 may additionally or alternatively:

increase a transmit power used for the transmission of the GC-PDCCH channel;

configure the communications device 400 to attempt to receive and to decode the PDCCH during all DRX on periods, regardless of whether or not a preceding GC-PDCCH transmission has been detected and decoded.

Although the above description and FIG. 11 illustrate various embodiments of a process in which the wake up signal functionality is provided by means of a GC-PDCCH or by means of information transmitted using the GC- PDCCH, the scope of the present disclosure is not limited to such cases. In some embodiments within the scope of the present disclosure, the wake up signal functionality may be provided by any appropriate means. Accordingly, the counter described above may be incremented whenever no wake up signal is detected at a time when a wake up signal may have been transmitted by the controlling node 321.

As described above, when in the RRC connected mode, the communications device 400 may be in either the DRX mode or in the active mode. According to some embodiments of the present technique, the behaviour of the communications device 400, in response to determining that it was unable to detect or to decode the group control information transmitted during a GC-PDCCH instance may differ depending on whether it is in the active mode or in the DRX mode. The group control information may, in some embodiments, be the group control information 502 of FIG. 5 or the group control information 802 of FIG. 8. Furthermore, the behaviour in each case may be configured by the controlling node 321.

Figure 12:
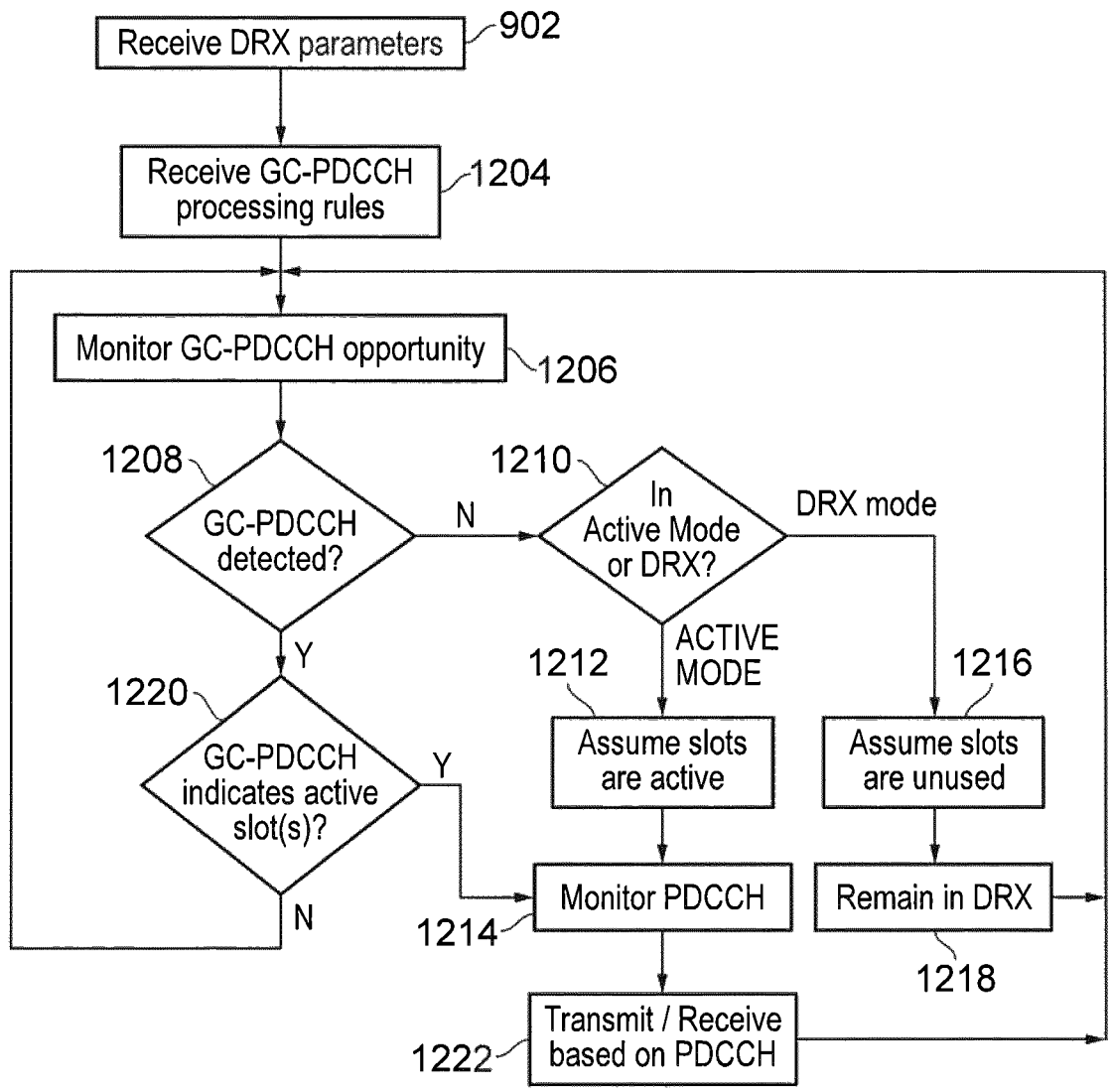

FIG. 12 is a flow diagram of a process which may be implemented by the communications device 400 according to such embodiments of the present technique. FIG. 12 starts with step 902 which corresponds to step 902 described above in respect of FIG. 9. At step 1204 the communications device 400 may receive processing rules from the controlling node 321 which specify how the communications device 400 is to behave in the event that it is unable to detect or to decode the group control information from the GC-PDCCH. Subsequently at step 1206 the communications device 400 monitors a transmission instance where the GC-PDCCH may be scheduled and at step 1208 determines whether group control information has been successfully received on the GC-PDCCH.

If the communications device 400 was unable to detect or to successfully decode the group control information at step 1208 then control passes to the step 1210 in which the communications device 400 determines whether it is in the active mode or in the DRX mode. Based on the determination in step 1210 then the communications device 400 performs the following steps based on the GC-PDCCH processing rules received at step 1204:

If, at step 1210 the communications device 400 determines that it is in active mode, control passes to step 1212 in which the communications device 400 assumes that one or more slots are active in the downlink and therefore that the communications device 400 should in step 1214 monitor the associated PDCCH during the active slots. The communications device 400 may determine which slots to monitor according to a conventional approach, for example, where the slots during which the communications device 400 attempts to decode the PDCCH are based on previously received system information or RRC signalling.

If at step 1210 the communications device 400 determines that it is in the DRX mode then control passes to step 1216 in which the communications device 400 assumes that all slots within the subsequent DRX on period are unused (that is, do not contain a valid PDCCH) and therefore at step 1218 the communications device 400 remains in the DRX mode and does not attempt to receive and to decode PDCCH signals during the subsequent DRX on period.

Returning to step 1208, if the GC-PDCCH is successfully received and the group control information is decoded then control passes to 1220 in which the group control information is interpreted and if the group control information indicates that no slots are active then control returns to step 1206 or some other step based on the current mode of operation of the communications device as appropriate. Alternatively, if at 1220 the group control information is determined to indicate that one or more slots are active that is to say include a valid PDCCH then control passes to 1214. In step 1214, the communications device 400 controls its receiver to be powered up (or to remain powered up) in order to receive PDCCH during the slot or slots indicated by the group control information received on the GC-PDCCH. If the communications device 400 is in the DRX mode, then the receiver may initially return to a low power mode of operation after receiving the group control information. In step 1222 the communications device 400 transmits or receives using shared channels in accordance with scheduling information contained within the PDCCH. Following step 1222 control returns to 1206.

FIG. 12 illustrates some example rules which may be provided to the communications device 400 in step 1204. However it will be appreciated that the process diagram illustrated in FIG. 12 may differ according to the actual processing rules received and may vary in different embodiments of the present technique. For example, one or more of the steps 1212, 1214, 1216 and 1218 may be configured by the controlling node 321 in step 1204, or may be defined in the appropriate specification documents, and may be different from that shown in FIG. 12 and described above.

In some embodiments of the present technique, the communications device 400 may, when in the active mode, determine, based on the group control information received in a slot, or based on the absence of a group control information detected and decoded in a slot, that a PDCCH may be scheduled during the immediately subsequent slot. The communications device 400 may, in such embodiments be configured to maintain a power to its receiver so as to receive and to decode the PDCCH transmitted in the next slot.

In the embodiment illustrated in FIG. 12 and described above, the GC-PDCCH transmission functions as a 'wake up' signal for the communications device 400 when it is in the DRX mode. However, in some embodiments and configurations, the GC-PDCCH may provide a 'go to sleep' functionality by appropriate configuration of the communications device 400. Accordingly, in some embodiments, the communications device 400 may be configured, when in the DRX mode, to treat the presence of a GC-PDCCH transmission at a scheduled time as a 'go to sleep' signal, that is, no PDCCH is scheduled to be transmitted during the next DRX on period, and the communications device 400 may accordingly configure its receiver to be in low power mode during the DRX on period. Similarly, the communications device 400 may be configured, when in the DRX mode, to treat the absence of a GC-PDCCH transmission at a scheduled time as a 'wake up' signal, that is, a PDCCH is scheduled to be transmitted during the next DRX on period, and the communications device 400 must accordingly configure its receiver to receive and to attempt to decode one or more PDCCH transmissions during the DRX on period.

In some embodiments of the present technique, the GC-PDCCH indicates a number of potential PDCCH candidates that are active in the following DRX on period. For example, the group control information transmitted using the GC-PDCCH may indicate one or more of the following:

The following DRX period is inactive (in other words, that no PDCCH are scheduled for the duration of the DRX on period);
a small number of PDCCH are active; and
a full number of PDCCH are active.

If a small number of PDCCH are indicated as being active, then even if it is not indicated which particular PDCCHs are active, the communications device 400 may nevertheless set a reduced maximum number of blind decoding attempts during the DRX on period and accordingly save power. In some embodiments, based on receiving an indication of the number of active PDCCHs, the communications device 400 determines which PDCCH or PDCCHs to blind decode, and accordingly receives and attempts to decode signals associated with only the determined PDCCH instances within the DRX on period.

Indicating that a full number of PDCCH are active provides the controlling node 321 with a high degree of scheduling flexibility since it allows for the scheduling of multiple communications devices within the DRX on period.

In some embodiments of the present technique, the GC-PDCCH may be used to indicate whether a PDCCH is scheduled within one or more slots. In some embodiments, the group control information transmitted in the GC-PDCCH may indicate solely that the communications device 400 is required to power up its receiver and to attempt to receive and to decode one or more PDCCH transmissions. For example, the group control information may be generated by the controlling node 321 prior to scheduling transmissions for the communications device 400, and as such, the controlling node 321 may or may not actually transmit PDCCH transmissions in accordance with the group control information. Alternatively, the controlling node 321 may generate and transmit the group control information based on a schedule which may be amended after the generation or the transmission of the group control information.

As will be appreciated, in such embodiments, the controlling node 321 retains a flexibility to amend or create a schedule for transmissions during a slot, even after the transmission of the group control information corresponding to that slot.

In some embodiments, instead of the GC-PDCCH indicating whether a PDCCH is scheduled within one or more slots, the GC-PDCCH may be additionally or alternatively be used to indicate whether or not a control channel resource set (CORESET) contains a search space in which a PDCCH may be transmitted. For example, in an example embodiment in which the GC-PDCCH transmission 404 of FIG. 4 occurs within the first time slot 402a of the DRX on period 402, the slot format indicator 504 transmitted in the GC-PDCCH transmission 404 may indicate whether one or more search spaces or CORESETs within the DRX on period 402 are active or not. It will be apparent that such information may be indicated (instead of active slot information) by means of the embodiments illustrated in FIGS. 7 and 8, or by means of the presence or absence of the GC-PDCCH transmission 404.

Various further example embodiments and features are defined in the following numbered paragraphs:

Paragraph 1. A method of receiving signals by a communications device from a wireless communications network, the method comprising
controlling a receiver of the communications device to reduce a power consumption in accordance with a discontinuous reception, DRX, off period in which no signals representing scheduling information are received via a physical downlink control channel when in a connected mode and in which the communications device can reduce a power to the receiver,
controlling the receiver of the communications device to increase the power consumption so as to detect whether or not signals from a group control channel have been received by the receiver either during the DRX off period or during a first time slot of a DRX on period in which signals representing scheduling information may be transmitted by the wireless communications network via the physical downlink control channel and in which the communications device may increase the power to the receiver, the group control channel providing a channel of a wireless access interface provided by the wireless communications network for receiving group control information transmitted by the wireless communications network for a group of communications devices, the communications device being a member of the group, and the group control information received on the group control channel providing an indication of whether the communications device should configure the receiver to receive the scheduling information on the physical downlink control channel during a time period, and,
if the signals from the group control channel have been received by the receiver and the group control information indicates that the communications device should configure the receiver to receive the scheduling information on the physical downlink control channel during the time period and the time period is within the DRX on period, then
controlling the receiver to restore power to the receiver so as to receive the scheduling information via the physical downlink control channel during the time period within the DRX on period indicated by the group control information,
receiving the signals representing scheduling information via the physical downlink control channel of the wireless access interface, and
configuring the receiver to receive signals via a shared channel of the wireless access interface in accordance with the scheduling information.

Paragraph 2. A method according to Paragraph 1, wherein the time period is a time slot,
the group control information received on the group control channel provides slot format information associated with each of a plurality of time slots including the time period, and
the slot format information associated with the time period provides the indication that the communications device should configure the receiver to receive the scheduling information on the physical downlink control channel during the time period.

Paragraph 3. A method according to Paragraph 1, wherein the time period is the DRX on period,
the group control information received on the group control channel provides a DRX active indicator associated with each of one or more DRX on periods including the time period, each DRX on period comprising one or more time slots, and each DRX active indicator indicating that the communications device should configure the receiver to receive the scheduling information on the physical downlink control channel during the associated DRX on period.

Paragraph 4. A method according to any of Paragraphs 1 to 3, the method comprising if no signals from the group control channel have been received by the receiver, controlling the receiver to reduce power so as not to receive signals representing scheduling information during the DRX on period.

Paragraph 5. A method according to any of Paragraphs 1 to 4, the method comprising
- detecting, during a plurality of DRX off periods, whether or not signals from the group control channel have been received by the receiver,
- determining that signals from the group control channel have not been received by the receiver during each of the plurality of DRX off periods, and
- if the number of the plurality of the DRX off periods in which the signals from the group control channel have not been received exceeds a predetermined threshold, controlling the receiver to restore power to the receiver so as to receive the scheduling information via the physical downlink control channel during a next DRX on period.

Paragraph 6. A method according to any of Paragraphs 1 to 3, the method comprising
- if the signals from the group control channel have been received by the receiver and the group control information does not provide an indication that the wireless communications network will transmit the scheduling information on the downlink physical control channel during the DRX on period, then controlling the receiver to reduce power so as not to receive signals representing scheduling information during the DRX on period.

Paragraph 7. A method according to any of Paragraphs 1 to 6, the method comprising
- receiving radio resource configuration, RRC, information from the wireless communications network indicating a desired behaviour of the communications device when signals from the group control channel have not been received correctly by the communications device when the communications device is in at least one of:
  - an active mode during which the communications device is required to monitor a physical downlink control channel continuously unless it receives an indication via the group control channel that monitoring is not required, and
  - a DRX mode during which the communications device is not required to monitor the physical downlink control channel continuously,
- detecting, when the communications device is in at least one of the active mode and the DRX mode, that signals from the group control channel have not been received by the receiver, and
- in response to the detecting, controlling the receiver in accordance with the received RRC information to either reduce power consumption so as not to receive the signals representing scheduling information via the physical downlink control channel, to restore power to the receiver so as to receive the scheduling information via the physical downlink control channel, or to maintain power to the receiver so as to receive the scheduling information via the physical downlink control channel.

Paragraph 8. A method according any of Paragraphs 1 to 7, the method comprising
- receiving radio resource configuration, RRC, information from the wireless communications network for configuring the receiver, the configuration information including at least one of:
  - one or more parameters indicating a transmission schedule for the group control channel and
  - one or more parameters for determining the DRX on period, and
- determining a starting time based on a start time of the DRX on period and the transmission schedule, wherein the controlling the receiver of the communications device to increase the power consumption so as to detect whether or not signals from a group control channel have been received by the receiver comprises detecting whether or not the signals from the group control channel have been received by the receiver starting at the determined starting time.

Paragraph 9. A method according to Paragraph 8, wherein the transmission schedule for the group control channel is based on a type of service being used by the communications device.

Paragraph 10. A method according to any of Paragraphs 1 to 9, wherein the group control channel is a group common physical downlink control channel.

Paragraph 11. A method of receiving signals by a communications device from a wireless communications network, the method comprising
- controlling a receiver of the communications device to reduce a power consumption in accordance with a discontinuous reception, DRX, off period in which no signals representing scheduling information are received via a physical downlink control channel when in a connected mode and in which the communications device can reduce a power to the receiver,
- detecting, during a plurality of DRX off periods whether or not signals providing a wake up signal have been received by the receiver,
- determining that no signals providing a wake up signal have been received by the receiver during each of the plurality of DRX off periods, and
- in response to determining that the number of the plurality of the DRX off periods in which the signals providing a wake up signal have not been received exceeds a predetermined threshold, controlling the receiver to restore power to the receiver so as to receive scheduling information via a physical downlink control channel during a next DRX on period in which signals representing scheduling information may be transmitted by the wireless communications network via the physical downlink control channel.

Paragraph 12. A communications device comprising
- receiver circuitry configured to receive signals from a wireless communications network via a wireless access interface provided by the wireless communications network, and
- controller circuitry for controlling the receiver circuitry, and the controller is configured
- to control the receiver circuitry to reduce a power consumption in accordance with a discontinuous reception, DRX, off period in which no signals representing scheduling information are received via a physical downlink control channel when in a connected mode and in which the communications device can reduce a power to the receiver circuitry,
- to control the receiver circuitry to increase the power consumption so as to detect whether or not signals from a group control channel have been received by the receiver either during the DRX off period or during a first time slot of a DRX on period in which signals representing scheduling information may be transmitted by the wireless communications network via the physical downlink control channel and in which the communications device may increase the power to the receiver circuitry, the group control channel providing a channel of the wireless access interface for receiving group control information transmitted by the wireless communications network for a group of communications devices, the communications device being a member of the group, and the group control information received on the group control channel providing an indication of whether the communications device should configure the receiver circuitry to receive the scheduling information on the physical downlink control channel during a time period, and,
if the signals from the group control channel have been received by the receiver circuitry and the group control information indicates that the communications device should configure the receiver circuitry to receive the scheduling information on the physical downlink control channel during the time period and the time period is within a DRX on period, then
to control the receiver circuitry to restore power to the receiver circuitry so as to receive the scheduling information via the physical downlink control channel during the time period within the DRX on period indicated by the group control information,
to receive the signals representing scheduling information via the physical downlink control channel of the wireless access interface, and
to configure the receiver circuitry to receive signals via a shared channel of the wireless access interface in accordance with the scheduling information.

Paragraph 13. A communications device comprising
receiver circuitry configured to receive signals from a wireless communications network via a wireless access interface provided by the wireless communications network, and
controller circuitry for controlling the receiver circuitry, and the controller is configured
to control the receiver circuitry of the communications device to reduce a power consumption in accordance with a discontinuous reception, DRX, off period in which no signals representing scheduling information are received via a physical downlink control channel when in a connected mode and in which the communications device can reduce a power to the receiver,
to detect, during a plurality of DRX off periods whether or not signals providing a wake up signal have been received by the receiver circuitry,
to determine that no signals providing a wake up signal have been received by the receiver circuitry during each of the plurality of DRX off periods, and
in response to determining that the number of the plurality of the DRX off periods in which the signals providing a wake up signal have not been received exceeds a predetermined threshold, to control the receiver circuitry to restore power to the receiver circuitry so as to receive scheduling information via a physical downlink control channel during a next DRX on period in which signals representing scheduling information may be transmitted by the wireless communications network via the physical downlink control channel.

Paragraph 14. A method of transmitting scheduling information to a communications device in a connected mode by a wireless communications network, the method comprising
scheduling a transmission time during a DRX on period of the communications device for transmitting signals representing the scheduling information via a physical downlink control channel to the communications device which can be received by the communications device by increasing a power to a receiver of the communications device,
transmitting, during a DRX off period or during a first time slot of the DRX on period, signals representing group control information on a group control channel, the DRX off period being a period during which no signals representing scheduling information are transmitted via the physical downlink control channel when the communications device is in a connected mode and during which the communications device can reduce the power to its receiver, the group control channel providing a channel of the wireless access interface for receiving group control information transmitted by the wireless communications network for a group of communications devices, the communications device being a member of the group, the group control information including an indication that the communications device should configure the receiver to receive the scheduling information via the physical downlink control channel during a time period, the time period including the transmission time, and
transmitting during the DRX on period the scheduling information for the communications device via the physical downlink control channel.

Paragraph 15. A method according to Paragraph 14, wherein
the time period is the time slot,
the group control information provides slot format information associated with each of a plurality of time slots including the time period, and
the slot format information associated with the time period provides the indication that the scheduling information for the communications device will be transmitted via the physical downlink control channel during the time period.

Paragraph 16. A method according to Paragraph 14, wherein
the time period is the DRX on period, and
the group control information provides one or more DRX active indicators each associated with one of one or more DRX on periods including the time period, each of the one or more DRX on periods comprising a plurality of time slots, the method comprising
indicating in the DRX active indicator associated with each of the DRX on periods which include the transmission time that the communications device should configure the receiver to receive the scheduling information for the communications device on the physical downlink control channel during the DRX on period associated with the DRX active indicator.

Paragraph 17. An infrastructure equipment for use in a wireless communications system, the wireless communications system comprising the infrastructure equipment and a communications device, the infrastructure equipment comprising
transmitter circuitry configured to transmit signals representing scheduling information via a wireless access interface provided by the mobile communications network to the communications device,
receiver circuitry configured to receive signals representing data transmitted via the wireless access interface by the wireless communications device, and
controller circuitry configured to control the transmitter circuitry and the receiver circuitry to transmit data to or receive data from the wireless communications device, wherein the controller circuitry is configured
to schedule a transmission time during a DRX on period of the communications device for transmitting signals representing scheduling information via a physical downlink control channel to the communications device which can be received by the communications device by increasing a power to a receiver of the communications device, to control the transmitter circuitry to transmit, during a DRX off period or during a first time slot of the DRX on period, signals representing group control information on a group control channel, the DRX off period being a period during which no signals representing scheduling information are transmitted via the physical downlink control channel when the communications device is in a connected mode and during which the communications device can reduce the power to its receiver, the group control channel providing a channel of the wireless access interface for receiving group control information transmitted by the wireless communications network for a group of communications devices, the communications device being a member of the group, the group control information including an indication that the communications device should configure the receiver to receive the scheduling information via the physical downlink control channel during a time period, the time period including the transmission time, and to control the transmitter circuitry to transmit during the DRX on period the scheduling information for the communications device via the physical downlink control channel.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

REFERENCES

[1] R1-1612068 "UE Power Evaluation for DRX with Wake-Up Signalling", Qualcomm. RAN1#87, Reno, USA. 14-18 Nov. 2016.

[2] R1-1711187 "Advanced Grant Information for UE Power Saving", Qualcomm. RAN1 adhoc, Qingdao, China. 27-30 Jun. 2017.

[3] LTE for UMTS: OFDMA and SC-FDMA Based Radio Access, Harris Holma and Antti Toskala, Wiley 2009, ISBN 978-0-470-99401-6

What is claimed is:

1. A method of receiving signals by a communications device from a wireless communications network, the method comprising:

controlling a receiver of the communications device to reduce a power consumption in accordance with a discontinuous reception (DRX) off period in which (1) no signals representing scheduling information are received via a physical downlink control channel (PDCCH) when in a connected mode and (2) the communications device can reduce a power to the receiver, the PDCCH being of a wireless access interface provided by the wireless communications network;

controlling the receiver of the communications device to increase the power consumption so as to detect whether or not signals from a group control channel have been received by the receiver during a first time slot of a DRX on period in which both (1) signals representing scheduling information may be transmitted by the wireless communications network via the PDCCH and (2) the communications device may increase the power to the receiver, wherein the group control channel provides a channel of the wireless access interface for receiving group control information transmitted by the wireless communications network for a group of communications devices, the communications device is a member of the group, and the group control information provides an indication of whether the communications device should configure the receiver to receive the scheduling information on the PDCCH during a time period; and in a case that both (1) the signals from the group control channel have been received by the receiver and the group control information indicates that the communications device should configure the receiver to receive the scheduling information on the PDCCH during the time period and (2) the time period is within the DRX on period:

controlling the receiver to restore power to the receiver so as to receive the scheduling information via the PDCCH during the time period within the DRX on period indicated by the group control information;

receiving the signals representing scheduling information via the PDCCH; and configuring the receiver to receive signals via a shared channel of the wireless access interface in accordance with the scheduling information, wherein the time period is the DRX on period, the group control information received on the group control channel provides a DRX active indicator associated with each of one or more DRX on periods including the time period, each DRX on period comprises one or more time slots, and each DRX active indicator includes a bitmap indicating, at a symbol level, a scheduled time for the PDCCH during the associated DRX on period.

2. The method according to claim 1, wherein the slot format information associated with the time period provides the indication that the communications device should configure the receiver to receive the scheduling information on the PDCCH during the time period.

3. The method according to claim 1, further comprising:
in a case that no signals from the group control channel have been received by the receiver, controlling the receiver to reduce power so as not to receive signals representing scheduling information during the DRX on period.

4. The method according to claim 1, further comprising:
detecting, during a plurality of DRX off periods, whether or not signals from the group control channel have been received by the receiver;
determining that signals from the group control channel have not been received by the receiver during each of the plurality of DRX off periods; and
in a case that the number of the plurality of the DRX off periods in which the signals from the group control channel have not been received exceeds a predetermined threshold, controlling the receiver to restore power to the receiver so as to receive the scheduling information via the PDCCH during a next DRX on period.

5. The method according to claim 1, further comprising:
in a case that the signals from the group control channel have been received by the receiver and the group control information does not provide an indication that the wireless communications network will transmit the scheduling information on the PDCCH during the DRX on period, controlling the receiver to reduce power so as not to receive signals representing scheduling information during the DRX on period.

6. The method according to claim 1, further comprising:
receiving radio resource configuration, RRC, information from the wireless communications network indicating a desired behavior of the communications device when signals from the group control channel have not been received correctly by the communications device when the communications device is in at least one of:
an active mode during which the communications device is required to monitor a PDCCH continuously unless it receives an indication via the group control channel that monitoring is not required, and
a DRX mode during which the communications device is not required to monitor the PDCCH continuously;
detecting, when the communications device is in at least one of the active mode and the DRX mode, that signals from the group control channel have not been received by the receiver; and
in response to the detecting, controlling the receiver in accordance with the received RRC information to either reduce power consumption so as not to receive the signals representing scheduling information via the PDCCH, to restore power to the receiver so as to receive the scheduling information via the PDCCH, or to maintain power to the receiver so as to receive the scheduling information via the PDCCH.

7. The method according claim 1, further comprising:
receiving radio resource configuration, RRC, information from the wireless communications network for configuring the receiver, the configuration information including at least one of:
one or more parameters indicating a transmission schedule for the group control channel, and
one or more parameters for determining the DRX on period; and
determining a starting time based on a start time of the DRX on period and the transmission schedule, wherein the controlling the receiver of the communications device to increase the power consumption so as to detect whether or not signals from a group control channel have been received by the receiver comprises detecting whether or not the signals from the group control channel have been received by the receiver starting at the determined starting time.

8. The method according to claim 7, wherein the transmission schedule for the group control channel is based on a type of service being used by the communications device.

9. The method according to claim 1, wherein the group control channel is a group common PDCCH.

10. A method of transmitting scheduling information to a communications device in a connected mode by a wireless communications network, the method comprising:
scheduling a transmission time during a discontinuous reception (DRX) on period of the communications device for transmitting signals representing the scheduling information via a physical downlink control channel (PDCCH) to the communications device which can be received by the communications device by increasing a power to a receiver of the communications device;
transmitting, during a first time slot of the DRX on period, signals representing group control information on a group control channel, the DRX off period being a period during which (1) no signals representing scheduling information are transmitted via the PDCCH when the communications device is in a connected mode and (2) the communications device can reduce the power to the receiver, wherein the group control channel provides a channel of the wireless access interface for receiving group control information transmitted by the wireless communications network for a group of communications devices, the communications device is a member of the group, the group control information includes an indication that the communications device should configure the receiver to receive the scheduling information via the PDCCH during a time period, and the time period includes the transmission time; and
transmitting, during the DRX on period, the scheduling information for the communications device via the PDCCH, wherein
the communications device is configured to, in a case that both (1) the signals from the group control channel have been received by the receiver and the group control information indicates that the communications device should configure the receiver to receive the scheduling information on the PDCCH during the time period and (2) the time period is within the DRX on period:
restore power to the receiver so as to receive the scheduling information via the PDCCH during the time period within the DRX on period indicated by the group control information;
receive the signals representing scheduling information via the PDCCH; and
configure the receiver to receive signals via a shared channel of the wireless access interface in accordance with the scheduling information, wherein
the time period is the DRX on period,
the group control information transmitted on the group control channel provides a DRX active indicator associated with each of one or more DRX on periods including the time period, each DRX on period comprises one or more time slots, and each DRX active indicator includes a bitmap indicating, at a symbol level, a scheduled time for the PDCCH during the associated DRX on period.

11. A communications device, comprising:

receiver circuitry configured to receive signals from a wireless communications network via a wireless access interface provided by the wireless communications network; and controller circuitry for controlling the receiver circuitry, the controller circuitry is configured to control the receiver circuitry to reduce a power consumption in accordance with a discontinuous reception (DRX) off period in which (1) no signals representing scheduling information are received via a physical downlink control channel (PDCCH) when in a connected mode and (2) the communications device can reduce a power to the receiver, the PDCCH being of a wireless access interface provided by the wireless communications network;

control the receiver circuitry to increase the power consumption so as to detect whether or not signals from a group control channel have been received by the receiver during a first time slot of a DRX on period in which (1) signals representing scheduling information may be transmitted by the wireless communications network via the PDCCH and (2) the communications device may increase the power to the receiver, wherein the group control channel provides a channel of the wireless access interface for receiving group control information transmitted by the wireless communications network for a group of communications devices, the communications device is a member of the group, and the group control information provides an indication of whether the communications device should configure the receiver to receive the scheduling information on the PDCCH during a time period; and in a case that both (1) the signals from the group control channel have been received by the receiver and the group control information indicates that the communications device should configure the receiver to receive the scheduling information on the PDCCH during the time period and (2) the time period is within the DRX on period:

control the receiver circuitry to restore power to the receiver so as to receive the scheduling information via the PDCCH during the time period within the DRX on period indicated by the group control information;

configure the receiver circuitry to receive the signals representing scheduling information via the PDCCH; and configure the receiver circuitry to receive signals via a shared channel of the wireless access interface in accordance with the scheduling information, wherein the time period is the DRX on period, the group control information received on the group control channel provides a DRX active indicator associated with each of one or more DRX on periods including the time period, each DRX on period comprises one or more time slots, and each DRX active indicator includes a bitmap indicating, at a symbol level, a scheduled time for the PDCCH during the associated DRX on period.

\* \* \* \* \*